US008666179B2

(12) United States Patent
Suzuki et al.

(10) Patent No.: US 8,666,179 B2
(45) Date of Patent: Mar. 4, 2014

(54) IMAGE ENCODING APPARATUS AND DECODING APPARATUS

(75) Inventors: Yoshinori Suzuki, Saitama (JP); Choong Seng Boon, Yokohama (JP); Thiow Keng Tan, Jalan Sindor (SG)

(73) Assignee: NTT DoCoMo, Inc., Tokyo (JP)

( * ) Notice: Subject to any disclaimer, the term of this patent is extended or adjusted under 35 U.S.C. 154(b) by 112 days.

(21) Appl. No.: 13/271,927

(22) Filed: Oct. 12, 2011

(65) Prior Publication Data

US 2012/0045141 A1  Feb. 23, 2012

Related U.S. Application Data

(63) Continuation of application No. PCT/JP2010/055216, filed on Mar. 25, 2010.

(30) Foreign Application Priority Data

Apr. 14, 2009  (JP) ................................ 2009-097795

(51) Int. Cl.
*G06K 9/36* (2006.01)

(52) U.S. Cl.
USPC ........................................................ 382/233

(58) Field of Classification Search
USPC ........................................................ 382/233
See application file for complete search history.

(56) References Cited

U.S. PATENT DOCUMENTS

| 4,813,056 | A | * | 3/1989 | Fedele | 375/246 |
| 6,765,964 | B1 | | 7/2004 | Conklin | 375/240.14 |
| 6,906,647 | B2 | | 6/2005 | Bossen | 341/107 |
| 7,003,035 | B2 | | 2/2006 | Tourapis et al. | 375/240.12 |
| 7,194,137 | B2 | * | 3/2007 | Chen et al. | 382/246 |
| 8,041,131 | B2 | * | 10/2011 | Li et al. | 382/232 |
| 2004/0114683 | A1 | * | 6/2004 | Schwarz et al. | 375/240.2 |
| 2004/0184538 | A1 | * | 9/2004 | Abe et al. | 375/240.12 |

(Continued)

FOREIGN PATENT DOCUMENTS

| CN | 1522543 A | 8/2004 |
| CN | 1565130 A | 1/2005 |

(Continued)

OTHER PUBLICATIONS

International Preliminary Report on Patentability for International Application No. PCT/JP2010/055216, dated Nov. 15, 2011, 5 pages.

(Continued)

*Primary Examiner* — Jingge Wu
(74) *Attorney, Agent, or Firm* — Brinks Gilson & Lione

(57) ABSTRACT

A picture encoding apparatus divides an input picture into a plurality of regions and produces quantized transform coefficients of one of the regions. A zero/non-zero coefficient information encoding unit included in the picture encoding apparatus encodes information representing the respective quantized transform coefficients of the one region as either a zero coefficient or a non-zero coefficient. A non-zero coefficient encoding unit included in the picture encoding apparatus encodes non-zero quantized transform coefficient included among the quantized transform coefficients of the one region. The non-zero coefficient encoding unit is configured to select, from a probability model composed of a plurality of estimated probabilities, an estimated probability used to encode an absolute value of a next non-zero quantized transform coefficient of the one region. The estimated probability is selected from the probability model based on a quantity of already encoded non-zero quantized transform coefficients of the one region.

9 Claims, 16 Drawing Sheets

(56) References Cited

U.S. PATENT DOCUMENTS

| | | | |
|---|---|---|---|
| 2004/0184544 A1* | 9/2004 | Kondo et al. | 375/240.23 |
| 2004/0196903 A1* | 10/2004 | Kottke et al. | 375/240.03 |
| 2006/0039621 A1* | 2/2006 | Toebes et al. | 382/245 |
| 2006/0133680 A1 | 6/2006 | Bossen | 382/240 |
| 2007/0071090 A1* | 3/2007 | Peng et al. | 375/240.2 |
| 2008/0056375 A1* | 3/2008 | Kondo et al. | 375/240.23 |
| 2008/0232476 A1* | 9/2008 | Jeon et al. | 375/240.24 |
| 2012/0027084 A1* | 2/2012 | Zhang et al. | 375/240.12 |

FOREIGN PATENT DOCUMENTS

| | | | | |
|---|---|---|---|---|
| JP | 2005-530375 | 10/2005 | | H04N 7/30 |
| JP | 2008-154252 | 7/2008 | | H03M 7/40 |
| WO | WO 03/043346 A1 | 5/2003 | | H04N 7/26 |
| WO | WO 03/088675 A1 | 10/2003 | | |
| WO | WO 03/092298 A1 | 11/2003 | | |
| WO | WO 2004/039083 A1 | 5/2004 | | H04N 7/50 |
| WO | WO 2010/119757 A1 | 10/2010 | | H04N 7/32 |

OTHER PUBLICATIONS

International Search Report issued by the Japanese Patent Office as International Searching Authority, in PCT Patent Application No. PCT/JP2010/055216, dated May 18, 2010 (2 pgs.);.

Chinese Office Action with English translation, dated Sep. 10, 2013, pp. 1-28, Chinese Patent Application Serial No. 201080016372.3, State Intellectual Property Office, Beijing, China.

* cited by examiner

*Fig.3*

| ABSOLUTE VALUE OF NON-ZERO QUANTIZED TRANSFORM COEFFICIENT | BIN STRINGS IN UNARY BINARIZATION |
|---|---|
| 1 | 0 |
| 2 | 10 |
| 3 | 110 |
| 4 | 1110 |
| 5 | 11110 |
| 6 | 111110 |
| 7 | 1111110 |
| 8 | 11111110 |
| .... | |

IMAGE ENCODING APPARATUS AND DECODING APPARATUS

This application is a continuation of PCT/JP2010/055216, filed Mar. 25, 2010, which claims the benefit of the filing date pursuant to 35 U.S.C. §119(e) of JP2009-097795, filed Apr. 14, 2009, both of which are incorporated herein by reference.

TECHNICAL FIELD

The present invention relates to image encoding/decoding system that includes an image encoding apparatus, method and program, and an image decoding apparatus, method and program.

BACKGROUND ART

In order to efficiently transmit and store picture data (still picture data and moving picture data), the picture data is conventionally compressed using compression encoding technology. As the compression encoding technology, systems such as, for example, MPEG-1 to 4 and H.261 to H.264 are widely used for the moving picture data.

SUMMARY OF INVENTION

Encoding and decoding an absolute value of non-zero quantized transform coefficients may be performed using a fixed estimated probability allocated to each frequency component. However, since an absolute value of the quantized transform coefficients changes with local features of the picture or with prediction performance of prediction encoding, generally, there is no strong correlation between each frequency component in the block and the absolute value of the quantized transform coefficients. Therefore, there are cases where sufficient encoding efficiency cannot be achieved, especially in pictures including drastic changes within the frame.

Entropy coding of the residual signal may be efficiently executed by selecting, based on the number, or quantity, of already encoded/decoded quantized transform coefficients in the block or an absolute value of such quantized transform coefficients, an estimated probability used for encoding/decoding the absolute value of the next non-zero quantized transform coefficient. The estimated probability may be selected from a probability model composed of a plurality of estimated probabilities.

An image encoding/decoding system may include an image encoding apparatus. An embodiment of the image encoding apparatus may include: a region division unit for dividing an input picture into a plurality of regions; a prediction unit for producing a prediction signal for a pixel signal included in one of the regions; a residual signal production unit for producing a residual signal between the prediction signal and the pixel signal of the one region; a transform unit for frequency-transforming the residual signal of the one region to produce transform coefficients; a quantizing unit for quantizing the transform coefficients of the one region to produce quantized transform coefficients; a zero/non-zero coefficient information encoding unit for encoding information representing the respective quantized transform coefficients of the one region as either a zero coefficient or a non-zero coefficient; and a non-zero coefficient encoding unit for encoding non-zero quantized transform coefficients among the quantized transform coefficients of the one region. The non-zero coefficient encoding unit is configured to select, from a probability model composed of a plurality of estimated probabilities, an estimated probability to be used for encoding an absolute value of the next non-zero quantized transform coefficient of the one region. The estimated probability selected from the probability model based on a quantity of already encoded non-zero quantized transform coefficients of the one region. It should be noted that, when the quantity, or number, of the already encoded non-zero quantized transform coefficients is N, the non-zero coefficient encoding unit may be configured to encode the absolute value of the next non-zero quantized transform coefficient, using the N-th estimated probability in the probability model composed of the plurality of estimated probabilities.

An image encoding apparatus according to one aspect of the image encoding/decoding system may alternatively, or in addition employ modes described below, in addition to the image encoding apparatus described above. That is, an embodiment of the image encoding apparatus may include: a region division unit for dividing an input picture into a plurality of regions; a prediction unit for producing a prediction signal for a pixel signal included in one of the regions; a residual signal production unit for producing a residual signal between the prediction signal and the pixel signal of the one region; a transform unit for frequency-transforming the residual signal of the one region to produce transform coefficients; a quantizing unit for quantizing the transform coefficients of the one region to produce quantized transform coefficients; a zero/non-zero coefficient information encoding unit for encoding information representing the respective quantized transform coefficients of the one region as either a zero coefficient or a non-zero coefficient; and a non-zero coefficient encoding unit for encoding non-zero quantized transform coefficients among the quantized transform coefficients of the one region; wherein the non-zero coefficient encoding unit is configured to select, from a probability model composed of a plurality of estimated probabilities, an estimated probability to be used for encoding the absolute value of the next non-zero quantized transform coefficient of the one region. The estimated probability selected from the probability model based on an absolute value of an already encoded non-zero quantized transform coefficient of the one region. It should be noted that, when a sum of the absolute value of the already encoded non-zero quantized transform coefficient is N, the non-zero coefficient encoding unit may be configured to encode the absolute value of the next non-zero quantized transform coefficient, using the N-th estimated probability in the probability model composed of the plurality of estimated probabilities.

In the image encoding apparatus described above, when the number, or quantity, of the estimated probabilities in the probability model is M and the N described above exceeds M, the non-zero coefficient encoding unit may be configured to encode the absolute value of the next non-zero quantized transform coefficient, using the M-th estimated probability.

Furthermore, the non-zero coefficient encoding unit may be configured to encode the non-zero quantized transform coefficients in the order of proceeding from the coefficient of a high frequency component to the coefficient of a low frequency component.

The image encoding/decoding system may also include an image decoding apparatus. An embodiment of the image decoding apparatus may include: a data analysis unit for extracting, from compressed data, encoded data of a residual signal of a target region serving as a process target; a zero/non-zero coefficient information decoding unit for decoding the encoded data of the residual signal of the region to restore information representing each quantized transform coefficient of the region as either a zero coefficient or a non-zero coefficient; a non-zero coefficient decoding unit for decoding the encoded data of the residual signal of the target region to restore a non-zero quantized transform coefficient; a de-quantizing unit for de-quantizing the decoded quantized transform coefficient of the region to produce a reproduction frequency transform coefficient; an inverse-transform unit for inverse-transforming the reproduction frequency transform coefficient of the region to produce a reproduction residual signal; a prediction unit for producing a prediction signal for a pixel signal included in the region; and a picture restoration unit for adding the prediction signal of the region and the reproduction residual signal to restore the pixel signal of the region; wherein the non-zero coefficient decoding unit is configured to select, from a probability model composed of a plurality of estimated probabilities, an estimated probability to be used for decoding an absolute value of the next non-zero quantized transform coefficient. The estimated probability is selected from the probability model based on a quantity of already decoded non-zero quantized transform coefficients of the region. It should be noted that, when the number, or quantity, of the already decoded non-zero quantized transform coefficients is N, the non-zero coefficient decoding unit may be configured to decode the absolute value of the next non-zero quantized transform coefficient, using the N-th estimated probability in the probability model composed of the plurality of estimated probabilities.

An image decoding apparatus according to one aspect of the image encoding/decoding system may alternatively, or in addition employ the modes described below, in addition to the image decoding apparatus described above. An embodiment of the image decoding apparatus may include: a data analysis unit for extracting, from compressed data, encoded data of a residual signal of a target region serving as a process target; a zero/non-zero coefficient information decoding unit for decoding the encoded data of the residual signal of the region to restore information representing each quantized transform coefficient of the region as either a zero coefficient or a non-zero coefficient; a non-zero coefficient decoding unit for decoding the encoded data of the residual signal of the target region to restore a non-zero quantized transform coefficient; a de-quantizing unit for de-quantizing the decoded quantized transform coefficient of the region to produce a reproduction frequency transform coefficient; an inverse-transform unit for inverse-transforming the reproduction frequency transform coefficient of the region to restore a reproduction residual signal; a prediction unit for producing a prediction signal for a pixel signal included in the region; and a picture restoration unit for adding the prediction signal of the region and the reproduction residual signal to restore the pixel signal of the region; wherein the non-zero coefficient decoding unit is configured to select, from a probability model composed of a plurality of estimated probabilities, an estimated probability to be used for decoding the absolute value of the next non-zero quantized transform coefficient. The estimated probability selected from the probability model based on an absolute value of an already decoded non-zero quantized transform coefficient of the region. It should be noted that, when a sum of the absolute value of the already decoded non-zero quantized transform coefficient is N, the non-zero coefficient decoding unit may be configured to decode the absolute value of the next non-zero quantized transform coefficient, using the N-th estimated probability in the probability model composed of the plurality of estimated probabilities.

In the image decoding apparatus described above, when the quantity of the estimated probabilities in the probability model is M and the N described above exceeds M, the non-zero coefficient decoding unit may be configured to decode the absolute value of the next non-zero quantized transform coefficient, using the M-th estimated probability.

Furthermore, the non-zero coefficient decoding unit may be configured to decode the non-zero quantized transform coefficients in the order of proceeding from the coefficient of a high frequency component to the coefficient of a low frequency component.

The image encoding/decoding system may include a picture encoding method performed by an embodiment of an image encoding apparatus as described below.

The picture encoding method may be performed by an embodiment of a picture encoding apparatus and includes: a region division step for dividing an input picture into a plurality of regions; a prediction step for producing a prediction signal for a pixel signal included in one of the regions; a residual signal production step for producing a residual signal between the prediction signal and the pixel signal in the one region; a transform step for frequency-transforming the residual signal of the one region to produce a transform coefficient; a quantizing step for quantizing the transform coefficients of the one region to produce quantized transform coefficients; a zero/non-zero coefficient information encoding step for encoding information representing the respective quantized transform coefficients of the one region as either a zero coefficient or a non-zero coefficient; and a non-zero coefficient encoding step for encoding non-zero quantized transform coefficients among the quantized transform coefficients of the one region; wherein in the non-zero coefficient encoding step, the picture encoding apparatus selects, from a probability model composed of a plurality of estimated probabilities, an estimated probability to be used for encoding the absolute value of the next non-zero quantized transform coefficient of the one region, the estimated probability selected from the probability model based on a quantity of already encoded non-zero quantized transform coefficients of the one region. It should be noted that in the non-zero coefficient encoding step, when the quantity of the already encoded non-zero quantized transform coefficients is N, the picture encoding apparatus may encode the absolute value of the next non-zero quantized transform coefficient, using the N-th estimated probability in the probability model composed of the plurality of estimated probabilities.

A picture encoding method according to one aspect of the image encoding/decoding system alternatively or in addition may employ the modes described below, in addition to the picture encoding method described above. That is, the picture encoding method may be performed by an embodiment of a picture encoding apparatus and includes: a region division step for dividing an input picture into a plurality of regions; a prediction step for producing a prediction signal for a pixel signal included in one of the regions; a residual signal production step for producing a residual signal between the prediction signal and the pixel signal in the one region; a transform step for frequency-transforming the residual signal of the one region to produce transform coefficients; a quantizing step for quantizing the transform coefficients of the region to produce quantized transform coefficients; a zero/non-zero coefficient information encoding step for encoding information representing the respective quantized transform coefficients of the one region as either a zero coefficient or a non-zero coefficient; and a non-zero coefficient encoding step for encoding non-zero quantized transform coefficients among the quantized transform coefficients of the one region; wherein in the non-zero coefficient encoding step, the picture encoding apparatus selects, from a probability model composed of a plurality of estimated probabilities, an estimated probability to be used for encoding the absolute value of the next non-zero quantized transform coefficient of the one region, the estimated probability selected from the probability model based on an absolute value of an already encoded non-zero quantized transform coefficient of the one region. It should be noted that in the non-zero coefficient encoding step, when a sum of the absolute value of the already encoded non-zero quantized transform coefficient is N, the picture encoding apparatus may encode the absolute value of the next non-zero quantized transform coefficient using the N-th estimated probability in the probability model composed of the plurality of estimated probabilities.

Furthermore, the image encoding/decoding system may include a picture decoding method that may be performed by an embodiment of an image decoding apparatus, as described below.

The picture decoding method may be performed by an embodiment of a picture decoding apparatus that includes: a data analysis step for extracting, from compressed data, encoded data of a residual signal of a target region serving as a process target; a zero/non-zero coefficient information decoding step for decoding the encoded data of the residual signal of the region to restore information representing each quantized transform coefficient of the region as either a zero coefficient or a non-zero coefficient; a non-zero coefficient decoding step for decoding the encoded data of the residual signal of the target region to restore a non-zero quantized transform coefficient; a de-quantizing step for de-quantizing the decoded quantized transform coefficient of the region to produce a reproduction frequency transform coefficient; an inverse-transform step for inverse-transforming the reproduction frequency transform coefficient of the region to restore a reproduction residual signal; a prediction step for producing a prediction signal for a pixel signal included in the region; and a picture restoration step for adding the prediction signal of the region and the reproduction residual signal to restore the pixel signal of the region; wherein in the non-zero coefficient decoding step, the picture decoding apparatus selects, from a probability model composed of a plurality of estimated probabilities, an estimated probability to be used for decoding an absolute value of the next non-zero quantized transform coefficient of the region, the estimated probability selected from the probability model based on a quantity of already decoded non-zero quantized transform coefficients of the region. It should be noted that, in the non-zero coefficient decoding step, when the quantity of the already decoded non-zero quantized transform coefficients is N, the picture decoding apparatus may decode the absolute value of the next non-zero quantized transform coefficient, using the N-th estimated probability in the probability model composed of the plurality of estimated probabilities.

A picture decoding method according to one aspect of the image encoding/decoding system may alternatively, or in addition employ the modes described below, in addition to the picture decoding method described above. That is, a picture decoding method may be performed by an embodiment of a picture decoding apparatus and includes: a data analysis step for extracting, from compressed data, encoded data of a residual signal of a target region serving as a process target; a zero/non-zero coefficient information decoding step for decoding the encoded data of the residual signal of the region to restore information representing each quantized transform coefficient of the region as either a zero coefficient or a non-zero coefficient; a non-zero coefficient decoding step for decoding the encoded data of the residual signal of the target region to restore a non-zero quantized transform coefficient; a de-quantizing step for de-quantizing the decoded quantized transform coefficient of the region to produce a reproduction frequency transform coefficient; an inverse-transform step for inverse-transforming the reproduction frequency transform coefficient of the region to restore a reproduction residual signal; a prediction step for producing a prediction signal for a pixel signal included in the region; and a picture restoration step for adding the prediction signal of the region and the reproduction residual signal to restore the pixel signal of the region; wherein in the non-zero coefficient decoding step, the picture decoding apparatus selects, from a probability model composed of a plurality of estimated probabilities, an estimated probability to be used for decoding the absolute value of the next non-zero quantized transform coefficient of the region, the estimated probability selected from the probability model based on an absolute value of an already decoded non-zero quantized transform coefficient of the region. It should be noted that, in the non-zero coefficient decoding step, when a sum of the absolute value of the already decoded non-zero quantized transform coefficient is N, the picture decoding apparatus may decode the absolute value of the next non-zero quantized transform coefficient using the N-th estimated probability in the probability model composed of the plurality of estimated probabilities.

The image encoding/decoding system may also include an image encoding program and may be described as below.

A picture encoding program according to an example embodiment of the image encoding/decoding system may be stored in a non-transitory computer readable medium executable by a computer, the computer readable medium comprising one or more executable modules that may include: a region division module for dividing an input picture into a plurality of regions; a prediction module for producing a prediction signal for a pixel signal included in one of the regions; a residual signal production module for producing a residual signal between the prediction signal and the pixel signal in the one region; a transform module for frequency-transforming the residual signal of the one region to produce transform coefficients; a quantizing module for quantizing the transform coefficients of the one region to produce quantized transform coefficients; a zero/non-zero coefficient information encoding module for encoding information representing the respective quantized transform coefficients of the one region as either a zero coefficient or a non-zero coefficient; and a non-zero coefficient encoding module for encoding non-zero quantized transform coefficients among the quantized transform coefficients of the one region; wherein the non-zero coefficient encoding module is executable to select, from a probability model composed of a plurality of estimated probabilities, an estimated probability to be used for encoding an absolute value of the next non-zero quantized transform coefficient of the one region. The estimated probability selected from the probability model based on a quantity of already encoded non-zero quantized transform coefficients of the one region. It should be noted that, when the quantity of the already encoded non-zero quantized transform coefficients is N, the non-zero coefficient encoding module may encode the absolute value of the next non-zero quantized transform coefficient, using the N-th estimated probability in the probability model composed of the plurality of estimated probabilities.

A picture encoding program according to one aspect of the image encoding/decoding system may alternatively, or in addition employ the modes described below, in addition to the picture encoding program described above. That is, the picture encoding program according to another example embodiment of the image encoding/decoding system may be stored in a non-transitory computer readable medium executable by a computer, the computer readable medium comprising one or more executable modules that may include: a region division module for dividing an input picture into a plurality of regions; a prediction module for producing a prediction signal for a pixel signal included in one of the regions; a residual signal production module for producing a residual signal between the prediction signal and the pixel signal in the one region; a transform module for frequency-transforming the residual signal of the one region to produce transform coefficients; a quantizing module for quantizing the transform coefficient of the one region to produce quantized transform coefficients; a zero/non-zero coefficient information encoding module for encoding information representing the respective quantized transform coefficients of the one region as either a zero coefficient or a non-zero coefficient; and a non-zero coefficient encoding module for encoding a non-zero quantized transform coefficient of the regions; wherein the non-zero coefficient encoding module is executable to select, from a probability model composed of a plurality of estimated probabilities, an estimated probability to be used for encoding the absolute value of the next non-zero quantized transform coefficient of the one region. The estimated probability selected from the probability model based on an absolute value of an already encoded non-zero quantized transform coefficient of the one region. It should be noted that, when a sum of the absolute value of the already encoded non-zero quantized transform coefficient is N, the non-zero coefficient encoding module may encode the absolute value of the next non-zero quantized transform coefficient, using the N-th estimated probability in the probability model composed of the plurality of estimated probabilities.

The image encoding/decoding system may include a picture decoding program performed by an image decoding apparatus as described below.

A picture decoding program according to another example embodiment of the image encoding/decoding system may be stored in a non-transitory computer readable medium executable by a computer, the computer readable medium comprising one or more executable modules that may include: a data analysis module for extracting, from compressed data, encoded data of a residual signal of a target region serving as a process target; a zero/non-zero coefficient information decoding module for decoding the encoded data of the residual signal of the region to restore information representing each quantized transform coefficient of the region as either a zero coefficient or a non-zero coefficient; a non-zero coefficient decoding module for decoding the encoded data of the residual signal of the target region to restore a non-zero quantized transform coefficient; a de-quantizing module for de-quantizing the decoded quantized transform coefficient of the region to produce a reproduction frequency transform coefficient; an inverse-transform module for inverse-transforming the reproduction frequency transform coefficient of the region to restore a reproduction residual signal; a prediction module for producing a prediction signal for a pixel signal included in the region; and a picture restoration module for adding the prediction signal of the region and the reproduction residual signal to restore the pixel signal of the region; wherein the non-zero coefficient decoding module is executable to select, from a probability model composed of a plurality of estimated probabilities, an estimated probability to be used for decoding an absolute value of the next non-zero quantized transform coefficient. The estimated probability selected from the probability model based on a quantity of already decoded non-zero quantized transform coefficients of the one region. It should be noted that, when the quantity of the already decoded non-zero quantized transform coefficients is N, the non-zero coefficient decoding module may decode the absolute value of the next non-zero quantized transform coefficient, using the N-th estimated probability in the probability model composed of the plurality of estimated probabilities.

A picture decoding program according to one aspect of the image encoding/decoding system may alternatively or in addition employ the modes described below, in addition to the picture decoding program described above. That is, the picture decoding program according to another example embodiment of the encoding/decoding apparatus or device may be stored in a non-transitory computer readable medium executable by a computer, the computer readable medium comprising one or more executable modules, which may include: a data analysis module for extracting, from compressed data, encoded data of a residual signal of a target region serving as a process target; a zero/non-zero coefficient information decoding module for decoding the encoded data of the residual signal of the region to restore information representing each quantized transform coefficient of the region as either a zero coefficient or a non-zero coefficient; a non-zero coefficient decoding module for decoding the encoded data of the residual signal of the target region to restore a non-zero quantized transform coefficient; a de-quantizing module for de-quantizing the decoded quantized transform coefficient of the region to produce a reproduction frequency transform coefficient; an inverse-transform module for inverse-transforming the reproduction frequency transform coefficient of the region to restore a reproduction residual signal; a prediction module for producing a prediction signal for a pixel signal included in the region; and a picture restoration module for adding the prediction signal of the region and the reproduction residual signal to restore the pixel signal of the region; wherein the non-zero coefficient decoding module is executable to select, from a probability model composed of a plurality of estimated probabilities, an estimated probability to be used for decoding the absolute value of the next non-zero quantized transform coefficient of the region. The estimated probability selected from the probability model based on an absolute value of an already decoded non-zero quantized transform coefficient of the region. It should be noted that, when a sum of the absolute value of the already decoded non-zero quantized transform coefficient is N, the non-zero coefficient decoding module may decode the absolute value of the next non-zero quantized transform coefficient, using the N-th estimated probability in the probability model composed of the plurality of estimated probabilities.

With the embodiments of the image encoding/decoding system, the estimated probability to be used for encoding/decoding the non-zero quantized transform coefficients can be selected in accordance with the state of the previously encoded quantized transform coefficients in the block, it is thus possible to efficiently entropy-code the residual signal.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF DRAWINGS

FIG. 3 is an example of a correspondence table to transform an absolute value of a non-zero quantized transform coefficient into bin strings in Unary binarization.

DESCRIPTION OF EMBODIMENTS

Figure 1:
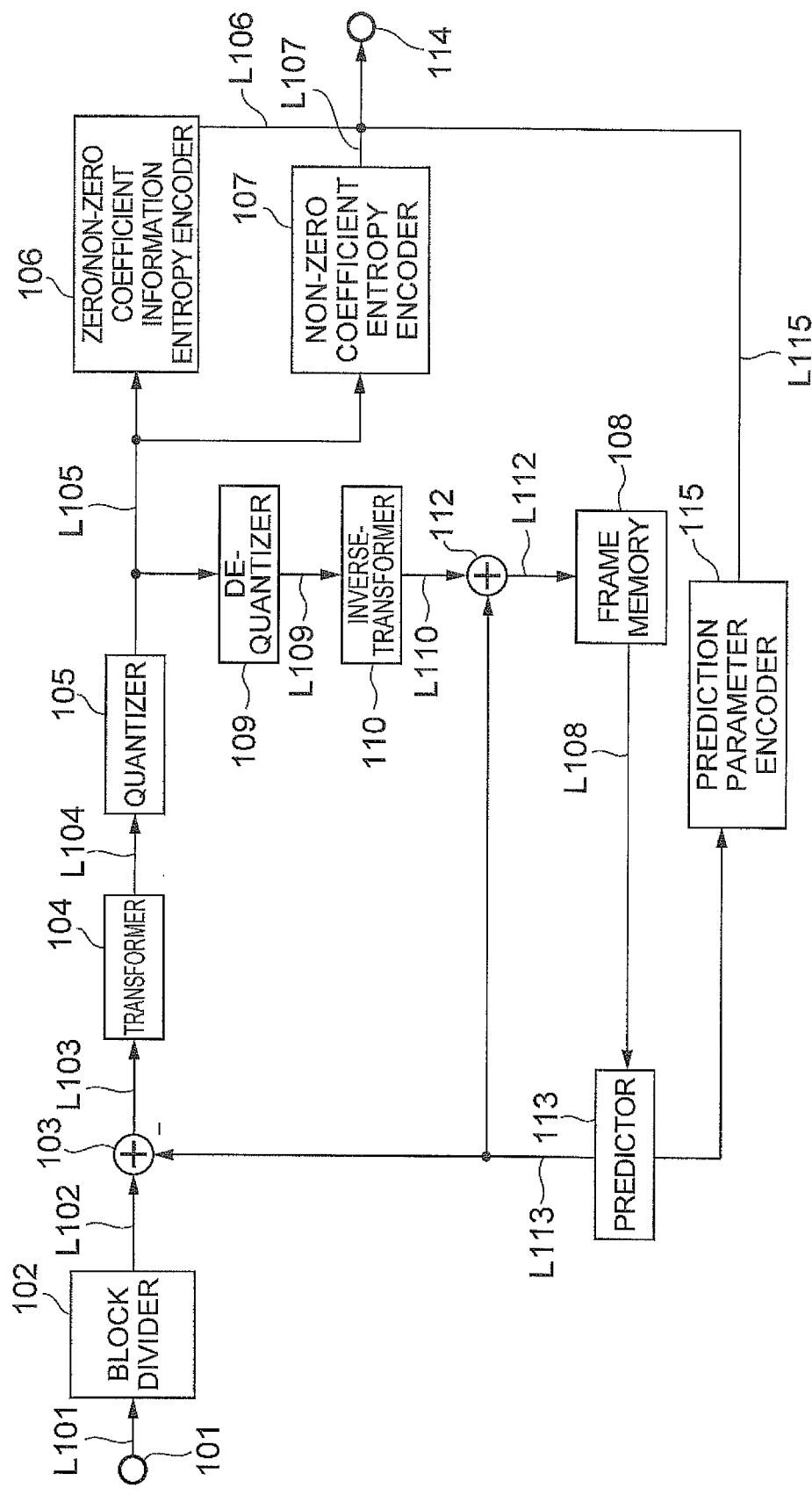
FIG. 1 is a block diagram of an example picture encoding apparatus according to the present embodiments.

Embodiments of the image encoding/decoding system will be described with reference to FIGS. 1 to 16.

An encoding process may be performed after dividing picture data serving as an encoding target into a plurality of blocks. Then, a prediction signal for a pixel signal in a target block serving as the encoding target may be produced. As a prediction method for producing a prediction signal, there is an intra-frame prediction method that makes a prediction from a decoded signal of an already encoded region within a frame, and an inter-frame prediction method that makes a prediction from the decoded signal of the previously encoded frame.

In the intra-frame prediction method, a prediction signal is produced by extrapolating an already reproduced pixel value adjacent to the encoding target block in a predetermined direction.

On the other hand, generally in the inter-frame prediction method, a prediction signal is produced by searching an already reproduced frame for a signal similar to the pixel signal in the encoding target block. Then, a motion vector that is a spatial displacement amount between a region configured by the signal identified in the search as similar to the pixel signal and the target block is encoded.

In order to correspond to local feature changes of the picture, a target block (for example, 16×16 block) is divided into sub-blocks in various block sizes (for example, 8×8, 8×16, 16×8, 8×4, 4×8, 4×4 and the like, in addition to 16×16) and for each sub-block, a prediction signal may be produced.

Next, the pixel signal of the target block may be subtracted from the prediction signal of the target block to produce a residual signal, which is frequency transformed by a discrete cosine transform or the like. Generally, when there is no rise and fall in the residual signal of a transform block, as the block size for frequency transform becomes larger, transform efficiency increases. However, the signal discontinues at a boundary of the prediction block, and if the frequency transform is applied to a large residual block for a residual signal straddling the boundary of the prediction block, a high frequency component increases and thereby encoding efficiency decreases. Therefore, the frequency transform is performed for the block unit equivalent to that in producing the prediction signal or for the block unit smaller than that in producing the prediction signal.

A frequency-transformed transform coefficient is quantized and then entropy-coded as quantized transform coefficients. There is a tendency that many zero values are included in the quantized transform coefficients of each block and such tendency becomes stronger, as prediction efficiency increases. As a method for efficiently encoding a zero-value coefficient, there is zero-tree encoding, for example. In zero-tree encoding, a quantized transform coefficient of the block is mapped out on a leaf in a tree structure (lower end in the tree structure) and based on a coefficient value at the leaf, a state (0 or 1) of a node (at a branch point in the tree structure) and the leaf in the tree structure is updated. Then, the state in the tree structure and the value of a non-zero quantized transform coefficient are encoded. Accordingly, by mapping out the quantized transform coefficients of the block on the leaves in the tree structure in such a way that the nodes and leaves below a certain node in the tree structure are zero values, it is possible to collectively encode the zero-value quantized transform coefficients with a small amount of encoding.

As for the non-zero quantized transform coefficients, an absolute value and a plus and minus sign of each coefficient may be arithmetic coded in an order proceeding from the coefficient of the high frequency component to the coefficient of the low frequency component. An absolute value of a non-zero quantized transform coefficient is, as shown in the example of FIG. 3, transformed into bin strings in Unary binarization and each bin value is binary arithmetic coded using a predetermined estimated probability. The plus and minus of the coefficient is also binary arithmetic coded using the estimated probability of the plus and minus sign that the plus is represented by "0" and the minus by "1".

Figure 4:
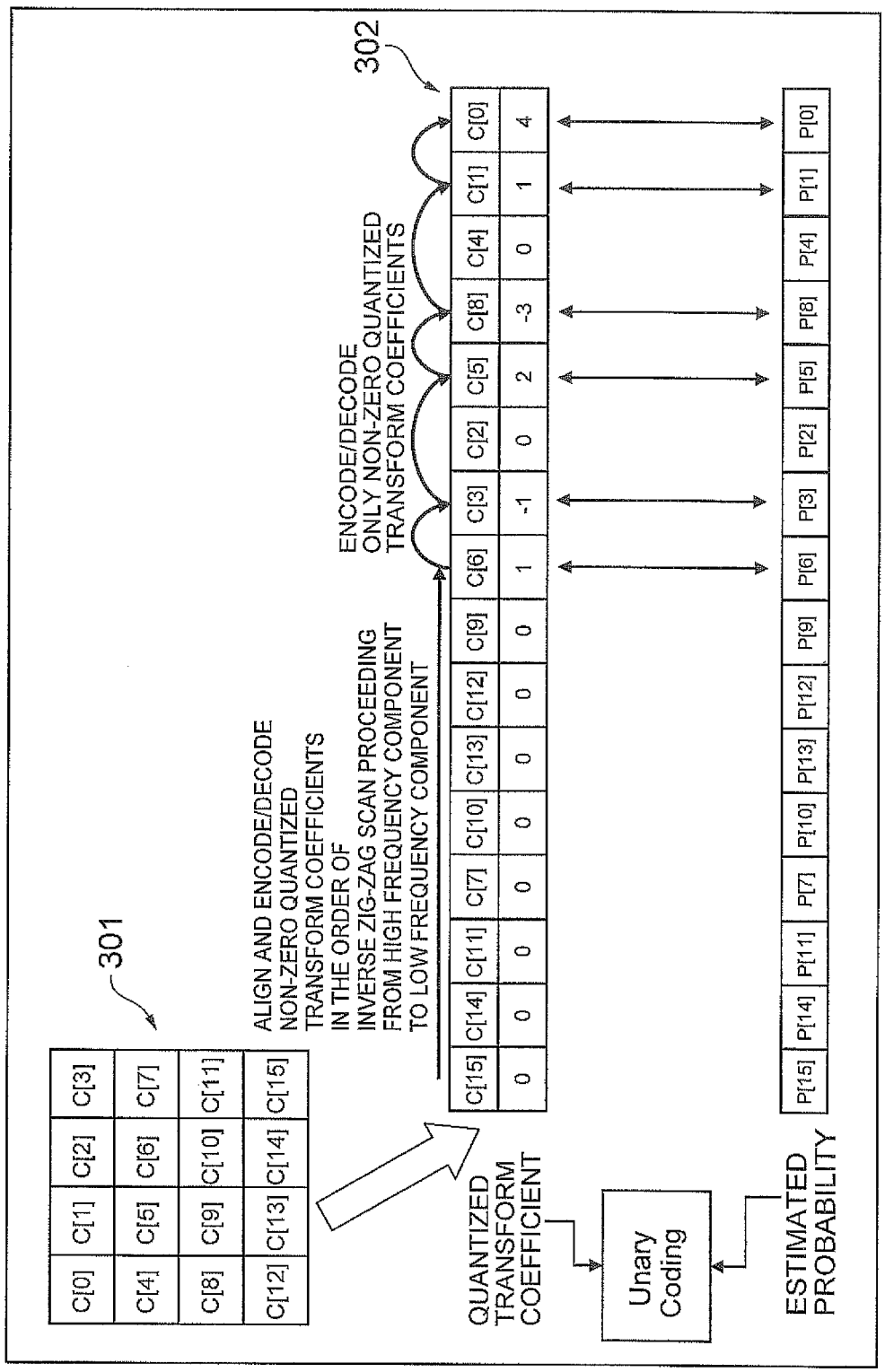
FIG. 4 is a schematic view illustrating an example estimated probability selection process used for encoding/decoding a non-zero quantized transform coefficient.

FIG. 4 shows an example of encoding a non-zero quantized transform coefficient, when the frequency transform is performed in a 4×4 block unit. C[0] to C[15] of a block 301 represent 16 pieces of the quantized transform coefficients. For binary arithmetic encoding/decoding the absolute value of each transform coefficient, the estimated probabilities P[0] to P[15] prepared in advance for the respective transform coefficients of the frequency component, are used. The non-zero quantized transform coefficients are aligned, as shown in a sequence of coefficients 302, in the order of an inverse-zigzag scan proceeding from the high frequency component to the low frequency component and are binary arithmetic coded/decoded.

In the coefficient sequence 302, first, "0" representing the bin strings of the absolute value "1" of C[6] in the Unary binarization is arithmetic coded using a probability P[6]. Subsequently, "0" representing the plus sign is encoded using the estimated probability of the plus and minus sign.

Similarly, the absolute values of C[3], C[5], C[8], C[1], and C[0] are transformed, in accordance with FIG. 4, into the bin strings in the Unary binarization and the respective transformed bits are binary arithmetic coded/decoded using the estimated probabilities of P[3], P[5], P[8], P[1], and P[0], respectively. It should be noted that each estimated probability is updated, based on the probability of actually encoded/decoded coefficient in encoding procedures. In the updating process, similar processes can be performed at an encoding and decoding side, whereby no mismatch between an encoding process and a decoding process occurs.

Picture Encoding Apparatus

FIG. 1 shows a block diagram of an example of an image encoding apparatus 100 included in the image encoding/decoding system. The image encoding apparatus 100 may be a computing device or computer, including for example software, hardware, or a combination of hardware and software, as described later, capable of performing the described functionality. The image encoding apparatus 100 may be one or more separate systems or devices included in the image encoding/decoding system, or may be combined with other systems or devices within the image encoding/decoding system. In other examples, fewer or additional blocks may be used to illustrate the functionality of the image encoding apparatus 100. The image encoding apparatus 100, or picture encoding apparatus 100 includes a plurality of units that include an input terminal 101, a block divider 102 (or region division unit), a subtracter 103 (or residual signal production unit), a transformer 104 (or transform unit), a quantizer 105 (or quantizing unit), a zero/non-zero coefficient information entropy encoder 106 (or zero/non-zero coefficient information entropy encoding unit), a non-zero coefficient entropy encoder 107 (or non-zero coefficient encoding unit), a frame memory 108, a de-quantizer 109 (or de-quantizer unit), an inverse-transformer 110 (or inverse-transform unit), an adder 112 (or adder unit), a predictor 113 (or prediction unit), a prediction parameter encoder 115 (or prediction parameter unit), and an output terminal 114. The term "unit" is defined to include one or more executable parts of an image encoding apparatus or image decoding apparatus. As described herein, the units are defined to include software, hardware or some combination thereof executable by a processor (described later). Software included in the units may include instructions stored in memory, or any other computer readable storage medium, that are executable by the processor, or any other processor. Hardware included in the units may include various devices, components, circuits, gates, circuit boards, and the like that are executable, directed, and/or controlled for performance by the processor.

Operations of the picture encoding apparatus 100 configured above will be described below. A signal for a moving picture composed of a plurality of pictures is input in the input terminal 101. A picture serving as an encoding target is divided into a plurality of regions by the block divider 102. The present embodiment describes an example encoding target that is divided into regions or divided blocks, where each region or divided block is composed of 8×8 pixels. The regions or divided blocks may be in a different size or shape in other examples.

Next, a region or divided block that is a target of an encoding process (hereinafter, referred to as the target block), is input in the subtracter 103.

The predictor 113 produces a prediction signal for a pixel signal of the target block, which is output to the subtracter 103. Examples of a prediction method include the inter-frame prediction method and the intra-frame prediction method. In the inter-frame prediction, a reproduction picture encoded and then decoded in the past is used as a reference picture or pixel signal, and from the reference picture motion information providing the prediction signal having the smallest difference from a sub-block, is obtained. On the other hand, in the intra-frame prediction, a copying process (copying process to each pixel position in the sub-block) based on a predetermined method using a value of an already reproduced pixel, or pixel signal, spatially adjacent to the sub-block, produces an intra-frame prediction signal. The method for producing a prediction signal is not limited to the examples described. Side information (prediction method, motion information, and the like) necessary for producing the prediction signal is entropy-coded (arithmetic signs, variable-length signs, and the like) and is output to the output terminal 114.

The subtracter 103 calculates a difference between a picture signal of the target block and the prediction signal to produce a residual signal of the target block, which is output to the transformer 104.

The residual signal may be, for example, discrete-cosine-transformed every four 4×4 pixel sub-blocks by the transformer 104, and transform coefficients of each transformed sub-block, or region, is output to the quantizer 105. It should be noted that, in the present embodiment, the sub-block size is 4×4 pixels, but may be of different sizes. In addition, division of a target block into sub-blocks is not necessarily required.

The quantizer 105 quantizes the transform coefficients of the sub-block to produce quantized transform coefficients, which are output to the zero/non-zero coefficient information entropy encoder 106 and the non-zero coefficient entropy encoder 107. In addition, the quantized transform coefficients of each sub-block are output to the de-quantizer 109.

The zero/non-zero coefficient information entropy encoder 106 entropy-codes a state of a zero value/non-zero value of each quantized transform coefficient in the sub-block, while the non-zero coefficient entropy encoder 107 entropy-codes a value of a non-zero quantized transform coefficient in the sub-block. Encoded data is output as the encoded data of the residual signal through the output terminal 114. Entropy coding in the present embodiment is described as arithmetic encoding. Each entropy coding of the zero/non-zero coefficient information entropy encoder 106 and the non-zero coefficient entropy encoder 107 is described below.

The zero/non-zero coefficient information entropy encoder 106 maps the quantized transform coefficients of each sub-block on leaves in a tree-structure prepared in advance, and updates, based on a coefficient value of each leaf, a state of a node and the leaves in the tree structure. Then, the state of the node and leaves in the tree structure is entropy-coded.

Here, the tree structure, sub-block division and zero-tree encoding are described. In the present embodiment, a method for dividing a target block of 8×8 pixels into four sub-blocks each composed of 16 pixels is described as an example.

An example method for producing a tree structure is described with reference to FIG. 2. In the tree structure, a branch point shown by an x mark is called a "node", and a lower end of the tree represented by the number is called a "leaf". The state of the node and leaf is represented by 0 or 1 value and the state of each node is decided by the state of two nodes or leaves at the branch ends. With respect to a certain node represented by x (target node), when the two nodes (or leaves) at the branch ends are both 0, the state of the target node becomes 0, while when any one or both of the two nodes (or leaves) is/are 1, the state of the target node becomes 1.

The number of a sub-block 61 indicates a position of each quantized transform coefficient in the sub-block and corresponds to the number in a tree 62 in the tree structure. Each quantized transform coefficient in the sub-block 61 is mapped on the leaf having the same number in the tree 62. The state of each leaf becomes 1, when the quantized transform coefficient mapped thereon is non-zero, and the state of each leaf becomes 0, when the quantized transform coefficient mapped thereon is zero. When the state of the leaves is decided, the state of the nodes with the x mark are decided in the order from bottom right to top left in the tree structure. Therefore, it is found that when the state of x is 0, every value of the quantized transform coefficient corresponding to the leaves belonging to the tree starting from that node become 0.

In the zero-tree encoding, the state of the node and leaves in the tree structure is encoded, in accordance with predetermined procedures (for example, by searching for x marks in the order from top left to bottom right). At that time, when the state of a certain node is 0, every state of the nodes and leaves that belong to the tree starting from the certain node become 0, therefore, it becomes unnecessary to encode the state of such nodes and leaves. Accordingly, a map indicating a correspondence between the leaves in the tree structure and each quantized transform coefficient is determined such that a zero coefficient of the quantized transform coefficient is efficiently encoded with a small encoding amount. A probability model is obtained by setting a probability of a single encoding component (the node, here) becoming 0 for each encoding component (the nodes and leaves, here). It should be noted that the same probability model, which is predetermined and provided in advance, may be used for encoding the state of the plurality of nodes and leaves. In addition, in the case of arithmetic coding, the probability model may be updated based on a generated code.

In this way, the zero/non-zero coefficient information entropy encoder 106 entropy-codes the state of the nodes and leaves. Then, encoded data representative of the state of the nodes and leaves in the target block is output to the output terminal 114.

The non-zero coefficient entropy encoder 107 encodes the non-zero quantized transform coefficients of the sub-block in the input target block, which is output to the output terminal 114.

Figure 5:
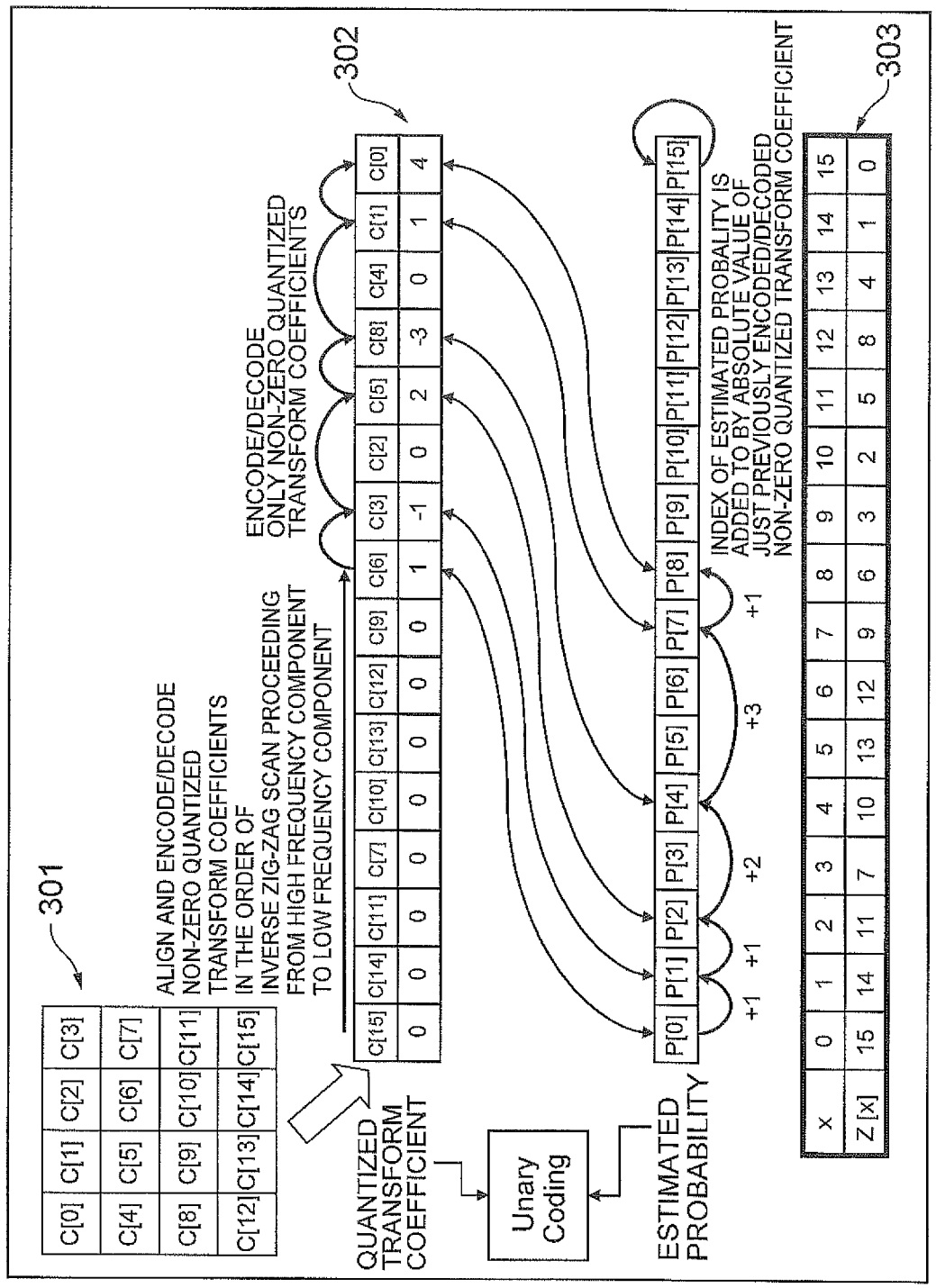
FIG. 5 is a schematic view illustrating an example estimated probability selection process used for encoding/decoding non-zero quantized transform coefficients.

With reference to FIG. 5, an example method for encoding a non-zero quantized transform coefficient is described.

In encoding of the non-zero quantized transform coefficients, an absolute value, and a plus and minus sign of each coefficient are arithmetically coded in the order proceeding from the coefficient of a high frequency component to the coefficient of a low frequency component. Specifically, as shown in FIG. 3, the absolute value of a non-zero quantized transform coefficient is transformed into bin strings in Unary binarization. Using the probability model for encoding the bin strings that are the binarized quantized transform coefficients of the sub-block, a plurality of estimated probabilities each having a different 0 occurrence probability, are prepared. Then, each bin value is binary arithmetic coded using the estimated probability selected based on the absolute value of a previously encoded transform coefficient of the sub-block. The plus and minus signs of the coefficient are also arithmetic coded, as "0" for the plus sign and "1" for the minus sign, by using the estimated probability of the plus and minus signs.

Figure 15:
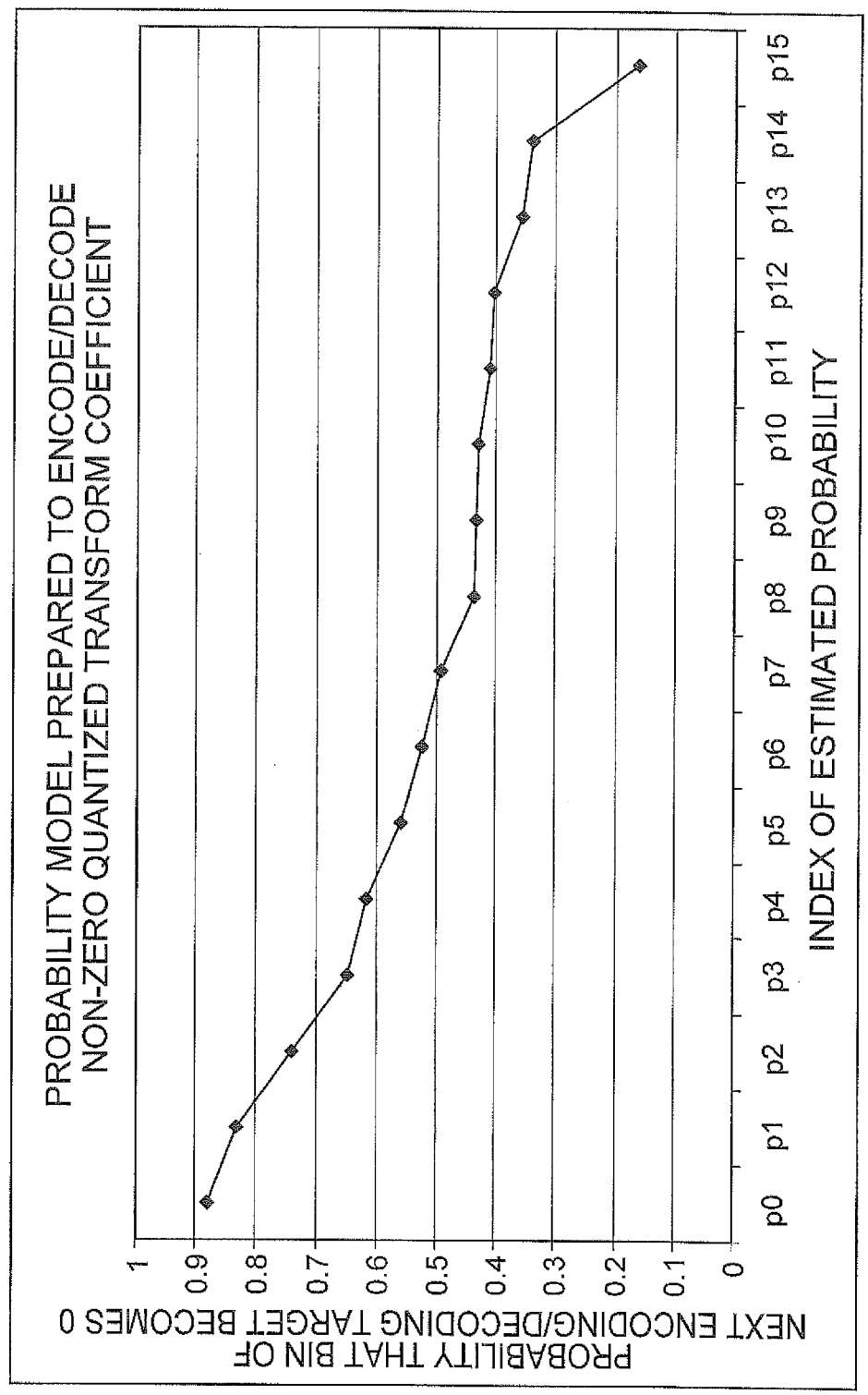
FIG. 15 is a graph illustrating an example of a probability model prepared for encoding/decoding the non-zero quantized transform coefficient in the present embodiments.

FIG. 5 shows an estimated probability selection process in encoding/decoding the non-zero transform coefficients, when frequency transform is performed in the unit of a 4×4 sub-block. In a block 301, C[0] to C[15] represent 16 pieces or quantized transform coefficients (an index in [ ] identifies the position of each of the quantized transform coefficients in the sub block). Using the probability model for binary arithmetic coding/decoding of the absolute value of each transform coefficient, 16 estimated probabilities (or pieces) having a different frequency of 0 binary value (P[0] to P[15]; an index in [ ] identifies the estimated probability) are prepared. In the present embodiment, 16 estimated probabilities (or pieces) are prepared and set such that the occurrence probability of 0 value becomes smaller as proceeding from P[0] to P[15]. FIG. 15 shows initial data of an example probability model. In other examples, other forms of probability models may be used. The abscissa of FIG. 15 represents the index of the estimated probabilities and the ordinate represents the probability that the bin of the next encoding/decoding target becomes 0, respectively.

The non-zero quantized transform coefficients are arranged, as shown in a sequence of coefficients 302, in the order of an inverse zigzag scan proceeding from a high frequency component to a low frequency component and are binary arithmetic coded/decoded.

In an example of the sequence of coefficients 302, first, the sequence of the coefficients is searched in the order of the inverse zigzag scan and a non-zero coefficient (C[6] in the example of FIG. 5) is detected. Then, "0" representing the bin strings of the absolute value "1" of C[6] in the Unary binarization, is arithmetic coded/decoded using the probability P[0]. Subsequently, "0" representing the plus sign is encoded/decoded using the estimated probability of the plus and minus sign (for example, the probability that the sign is plus). It should be noted that P[0] is the first in the 16 estimated probabilities to start.

Second, the sequence of coefficients is searched in the order of inverse zigzag scan from C[6] and the non-zero coefficient (C[3] in the example of FIG. 5) is detected. Then, "0" representing the bin strings of the absolute value "1" of C[3] in the Unary binarization, is arithmetic coded/decoded using the probability P[1]. In this case, since the absolute value of a just previously encoded/decoded coefficient is "1" here, P[1] obtained by adding "1" to the index of P[0] is used for encoding/decoding. Subsequently, "1" representing the minus sign is encoded/decoded using the estimated probability of the plus and minus sign.

Similarly, third, the sequence of coefficients is searched in the order of inverse zigzag scan from C[3] and the non-zero coefficient (C[5] in the example of FIG. 5) is detected. Then, each bin of "10" representing the bin strings of the absolute value "2" of C[5] in the Unary binarization, is arithmetic coded/decoded using the probability P[2], and subsequently "0" representing the plus sign is encoded/decoded using the estimated probability of the plus and minus sign. In this case, since the absolute value of the just previously encoded/decoded coefficient is "1", P[2] obtained by adding "1" to the index of P[1] is used for encoding/decoding.

Forth, the sequence of coefficients is searched in the order of inverse zigzag scan from C[5] and the non-zero coefficient (C[8] in the example of FIG. 5) is detected. Then, "110" representing the bin strings of the absolute value "3" of C[8] in the Unary binarization is arithmetic coded/decoded using the probability P[4], and subsequently "1" representing the minus sign is encoded/decoded using the estimated probability of the plus and minus sign. In this case, since the absolute value of the just previously encoded/decoded coefficient is "2", P[4] obtained by adding "2" to the index of P[2] is used for encoding/decoding.

Fifth, the sequence of coefficients is searched in the order of inverse zigzag scan from C[8] and the non-zero coefficient (C[1] in the example of FIG. 5) is detected. Then, "0" representing the bin strings of the absolute value "1" of C[1] in the Unary binarization, is arithmetic coded/decoded using the probability P[7], and subsequently, "0" representing the plus sign is encoded/decoded using the estimated probability of the plus and minus sign. In this case, since the absolute value of the just previously encoded/decoded coefficient is "3", P[7] obtained by adding "3" to the index of P[4] is used for encoding/decoding.

Finally, the sequence of coefficients is searched in the order of inverse zigzag scan from C[1] and the non-zero coefficient (C[0] in the example of FIG. 5) is detected. Then, "1110" representing the bin strings of the absolute value "4" of C[0] in the Unary binarization, is arithmetic coded/decoded using the probability P[8], and subsequently, "0" representing the plus sign is encoded/decoded using the estimated probability of the plus and minus sign. In this case, since the absolute value of the just previously encoded/decoded coefficient is "1" here, P[8] obtained by adding "1" to the index of P[7] is used for encoding/decoding.

In this way, the estimated probability to be used for encoding/decoding the absolute value of the next quantized transform coefficient, is selected based on the absolute value of the just previously encoded/decoded quantized transform coefficient. It should be noted that when the index of the estimated probability to be used next exceeds the maximum value prepared in the probability model (15 in the present embodiment), P[15] is repeatedly used, as shown in FIG. 5.

The estimated probability to be used for encoding/decoding the absolute value of the next quantized transform coefficient, is selected based on the quantity of the already encoded/decoded binary values of the sub-block. For example, when the absolute value of the just previously encoded/decoded quantized transform coefficient is "2" (in the example C[5] above); P[x+2] obtained by adding "2" to the index of P[x] (x=2 in this example) is used for encoding/decoding the absolute value of the next quantized transform coefficient (in the example C[8]).

Figure 16:
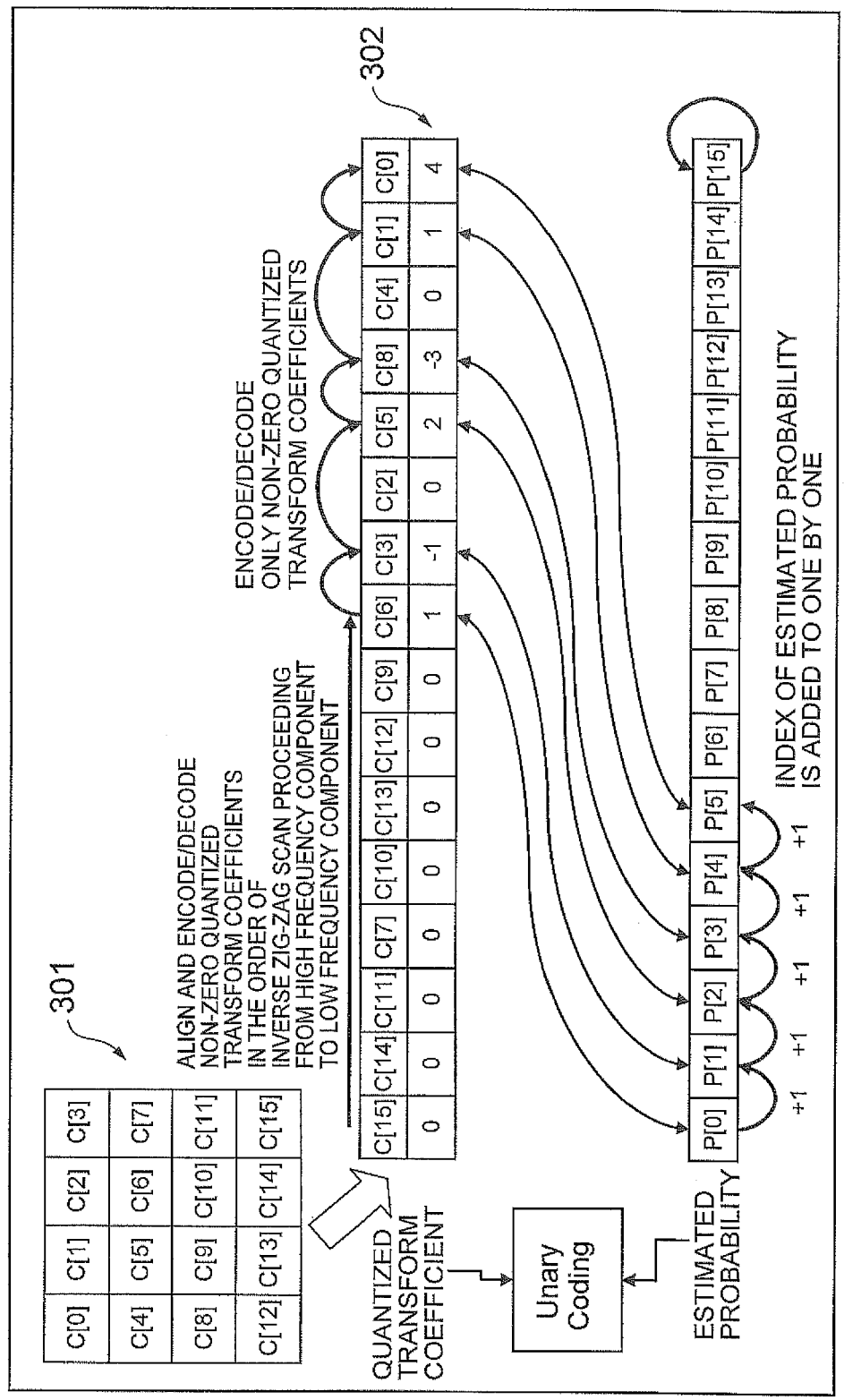
FIG. 16 is a schematic view illustrating another example of the estimated probability selection process used for encoding/decoding non-zero quantized transform coefficients.

As another example of the method shown in FIG. 5, there is a method in which the estimated probability to be used for encoding/decoding the next non-zero quantized transform coefficient, is selected based on the quantity (number of pieces) of the already encoded/decoded quantized transform coefficients of the sub-block. FIG. 16 shows such an example. In FIG. 16, when the just previous coefficient is encoded/decoded using P[x] (for example, C[6] is encoded/decoded using P[0]), P[x+1] is used for encoding/decoding the next coefficient (C[3] is encoded/decoded using P[1]). That is, the index of the estimated probability to be used is added one-by-one and thereby the estimated probability having the index corresponding to the quantity, or number, of the already encoded/decoded quantized transform coefficients is selected.

In addition, each estimated probability may be updated in an encoding/decoding procedure, based on a frequency of the actually encoded/decoded coefficient in the initial data. In such an updating process, it is possible to perform a similar process at an encoding/decoding and a decoding side, whereby a mismatch between the encoding process and a decoding process is avoided.

The de-quantizer 109 de-quantizes the quantized transform coefficient of each sub-block to restore the transform coefficient, which is output to the inverse-transformer 110.

The inverse-transformer 110 inverse-transforms the transform coefficient of each sub-block to restore a residual signal, which is output to the adder 112.

The adder 112 adds the restored residual signal of each sub-block to the prediction signal of the target block and restores a reproduction signal of the target block.

The restored reproduction signal is output to the frame memory 108 and is stored as the reference picture to be used for a prediction process.

Picture Encoding Method

Figure 6:
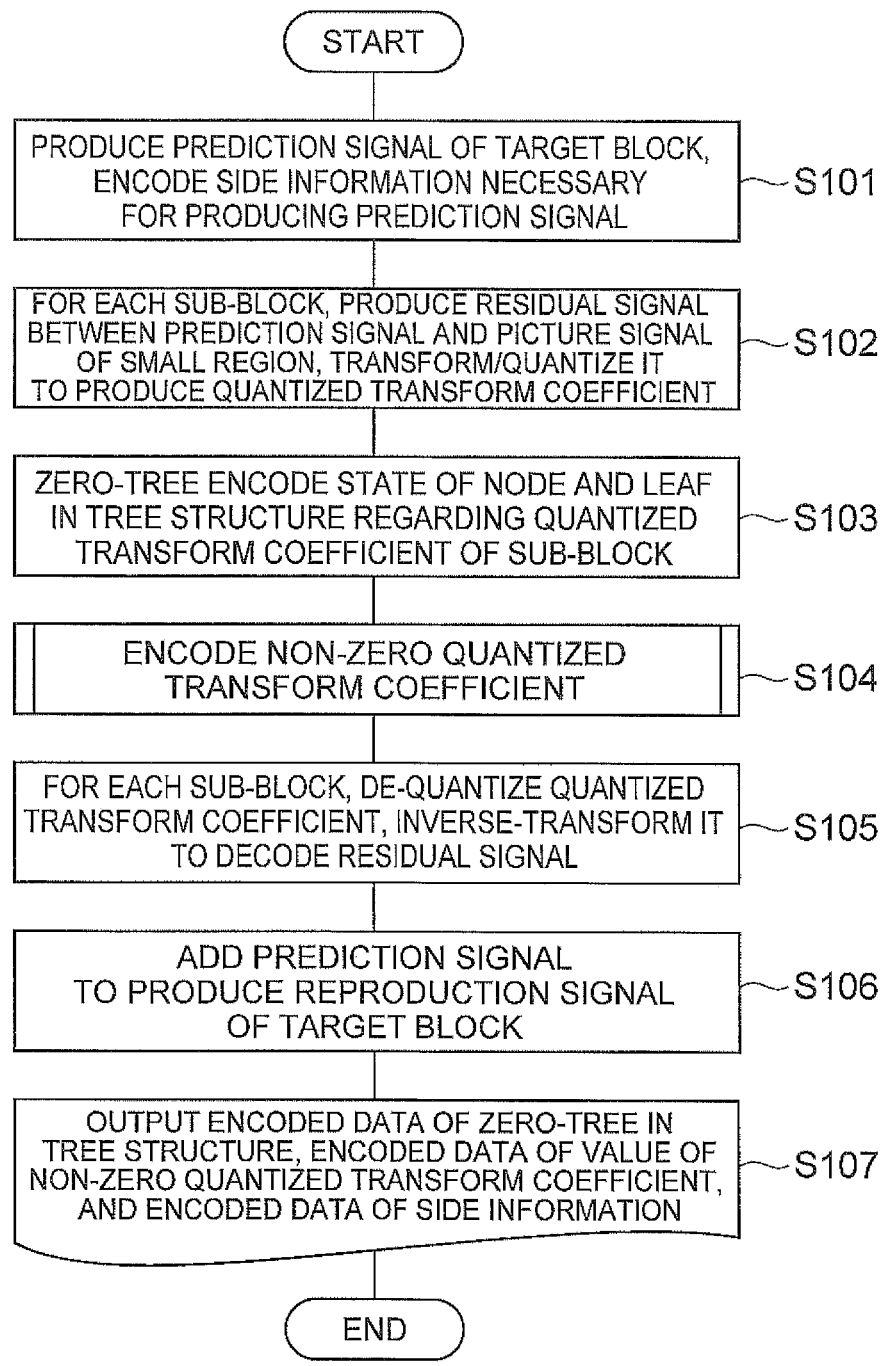
FIG. 6 is a flowchart illustrating an example picture encoding method according to the present embodiments.

With reference to FIG. 6, an example process relating to the picture encoding method performed by the picture encoding apparatus 100 will be described below. The diagram illustrates the encoding process for one block. The target block is an 8×8 pixel block.

First, the predictor 113 produces a prediction signal of the target block and encodes side information necessary for producing the prediction signal (S101). Subsequently, the subtracter 103 produces a residual signal between the prediction signal and the picture signal of the target block for each 4×4 pixel sub-block. The transformer 104 transforms the residual signal for each 4×4 pixel sub-block, and the quantizer 105 quantizes the transformed residual signal mentioned above for each 4×4 pixel sub-block, whereby quantized transform coefficients are produced (S102).

Figure 2:
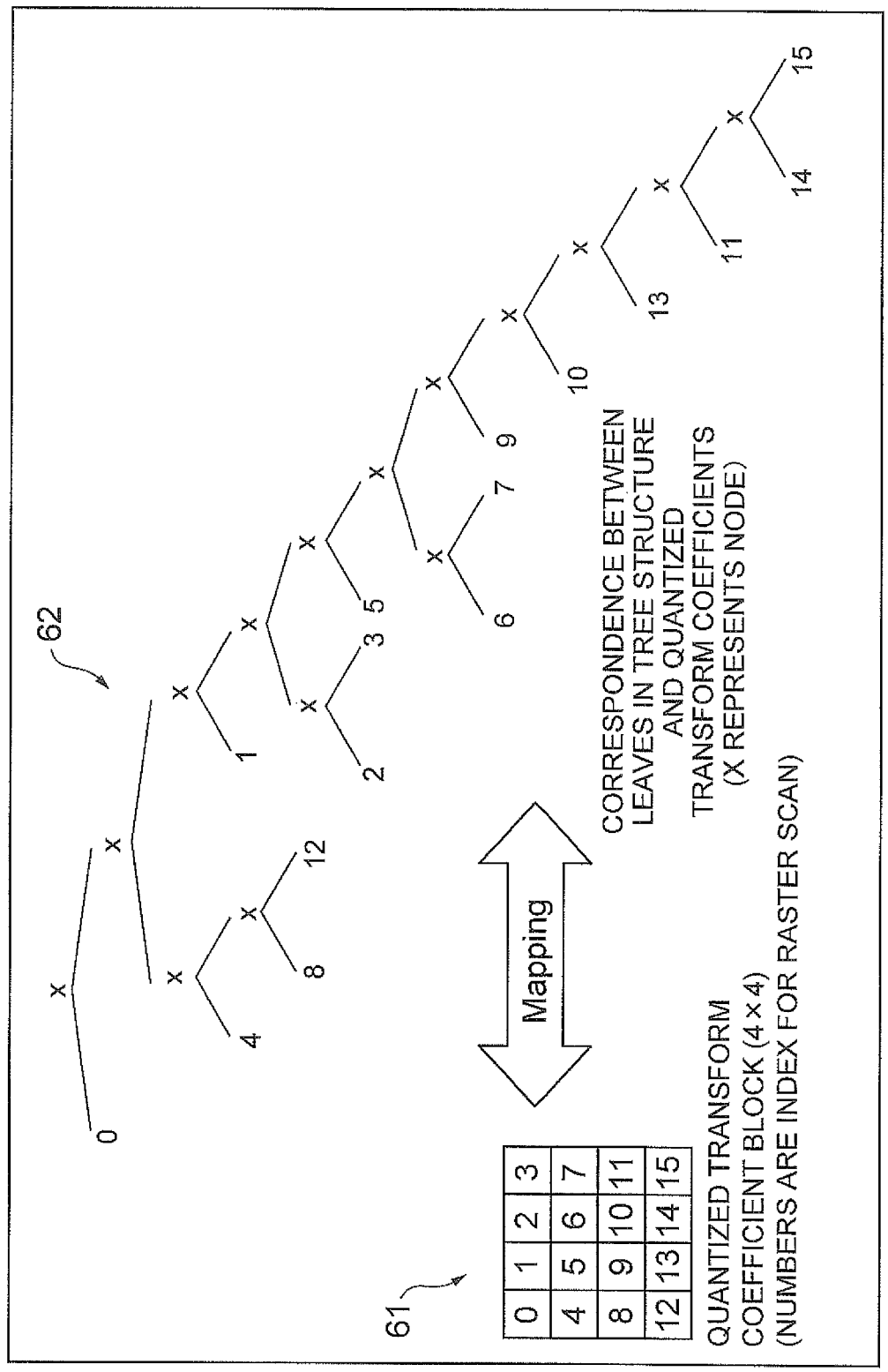
FIG. 2 is a schematic view showing an example mapping process of a quantized transform coefficient on a zero-tree.

Next, the zero/non-zero coefficient information entropy encoder 106 maps the quantized transform coefficients of the sub-block 61 on the leaves in the tree 62 in the tree structure, according to the process described in FIG. 2, and updates the state of the nodes and leaves in the tree structure based on the coefficient value of each leaf. Then, the state of the nodes and leaves in the tree structure is encoded (S103).

Next, the non-zero coefficient entropy encoder 107 encodes the non-zero coefficient out of the quantized transform coefficients of the sub-block, based on the estimated probability selection process shown in FIG. 5 (S104). Details will be described below.

Next, the de-quantizer 109 de-quantizes the quantized transform coefficients of each sub-block and the inverse-transformer 110 inverse-transforms the de-quantized quantized transform coefficients mentioned above, whereby the residual signal of each sub-block is restored (S105).

Next, the adder 112 adds the prediction signal of the target block to the residual signal of each sub-block to restore the reproduction signal of the target block (S106).

Finally, the picture encoding apparatus 100 outputs encoded data of the encoded zero-tree in the tree structure, encoded data of the non-zero quantized transform coefficients, and encoded data of the side information to be used for producing the prediction signal, from the output terminal 114 (S107).

Figure 7:
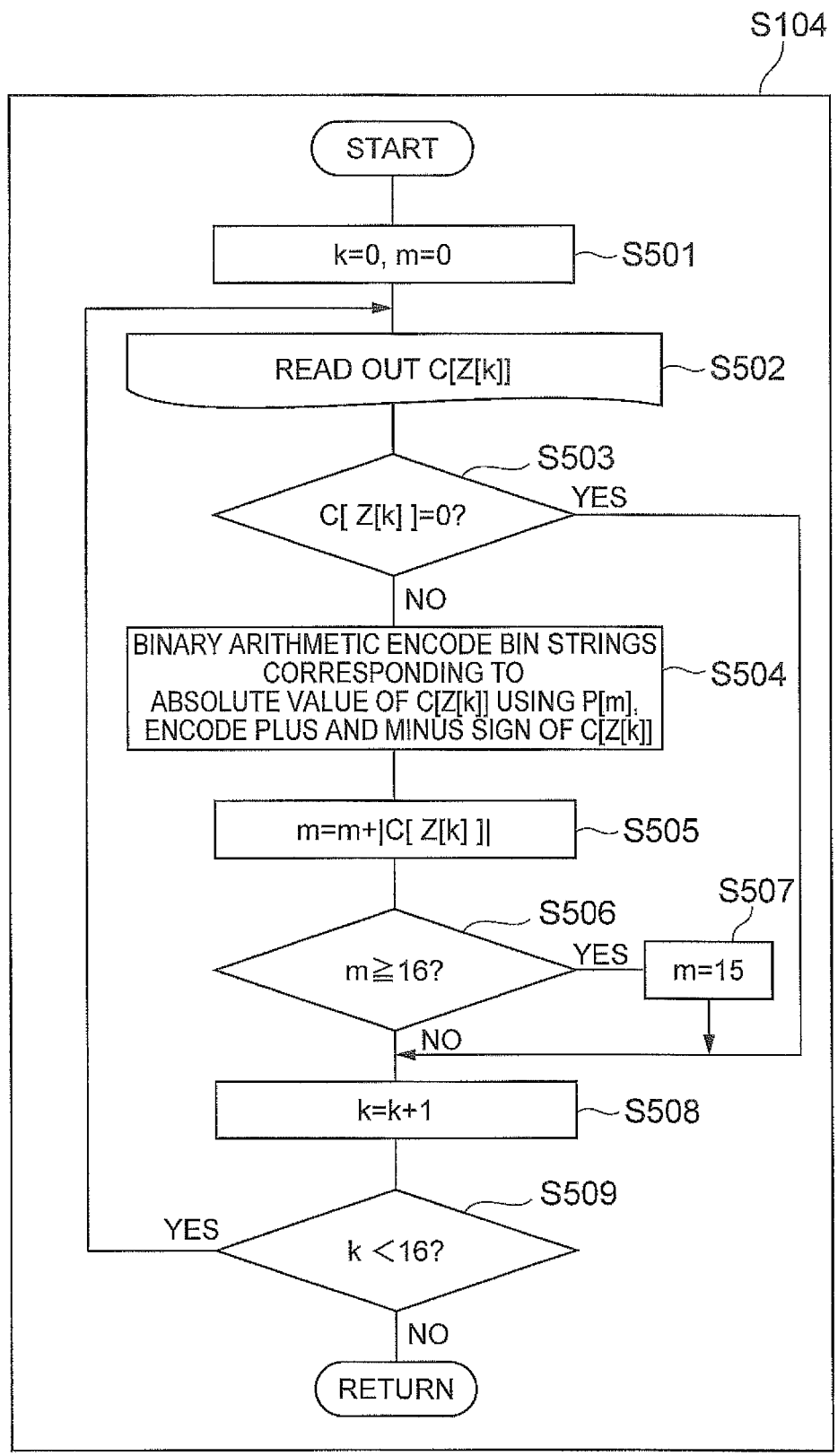
FIG. 7 is a flowchart illustrating example encoding procedures of the non-zero quantized transform coefficient according to the present embodiments.

FIG. 7 shows an example non-zero coefficient entropy coding process for the quantized transform coefficients of one 4×4 pixel sub-block, which is performed by the non-zero coefficient entropy encoder 107 (process at step S104 in FIG. 6). Z[k] in a flowchart of FIG. 7 represents a transformed index Z[k] obtained by transforming an index k of each coefficient of the block 301 of quantized transform coefficients in FIG. 5 through the inverse zigzag scan into the sequence of coefficients 302. A correspondence between the index k before transformation and the index Z[k] after the transformation is shown in a table 303 of FIG. 5.

First, the non-zero coefficient entropy encoder 107 initializes k representing an encoding order of the quantized transform coefficients of the sub-block and m representing an index of the estimated probability, to 0 (S501).

Next, the non-zero coefficient entropy encoder 107 reads a quantized transform coefficient C[Z[k]] shown in FIG. 5 (S502) and, if the value is "0", it proceeds to S508, while if not "0", it proceeds to S504 (S503).

At S504, the non-zero coefficient entropy encoder 107 binary arithmetic codes a bin strings corresponding to the absolute value of C[Z[k]] using P[m], and subsequently encodes the binary value of the plus and minus sign of C[Z[k]]. Since the binary arithmetic encoding is already described in FIG. 5, the description is omitted here.

The non-zero coefficient entropy encoder 107 adds the absolute value of C[Z[k]] to m to update the value of m at S505, and examines whether the value of m is 16 or more at S507. When the value of m is "16" or more, the value of m is set to "15" at S507, and when the value of m is less than "15", the value of k is added to "1" at S508, to encode the next quantized transform coefficient.

Subsequently, until the value of k becomes "16" and the encoding of every quantized transform coefficient of the sub-block is finished, the processes from S502 to S508 are repeated (S509).

It should be noted that at step S505, the value of m is updated by adding the absolute value of C[Z[k]] to m, but instead of the absolute value of C[Z[k]], 1 may be added.

Picture Decoding Apparatus

Figure 8:
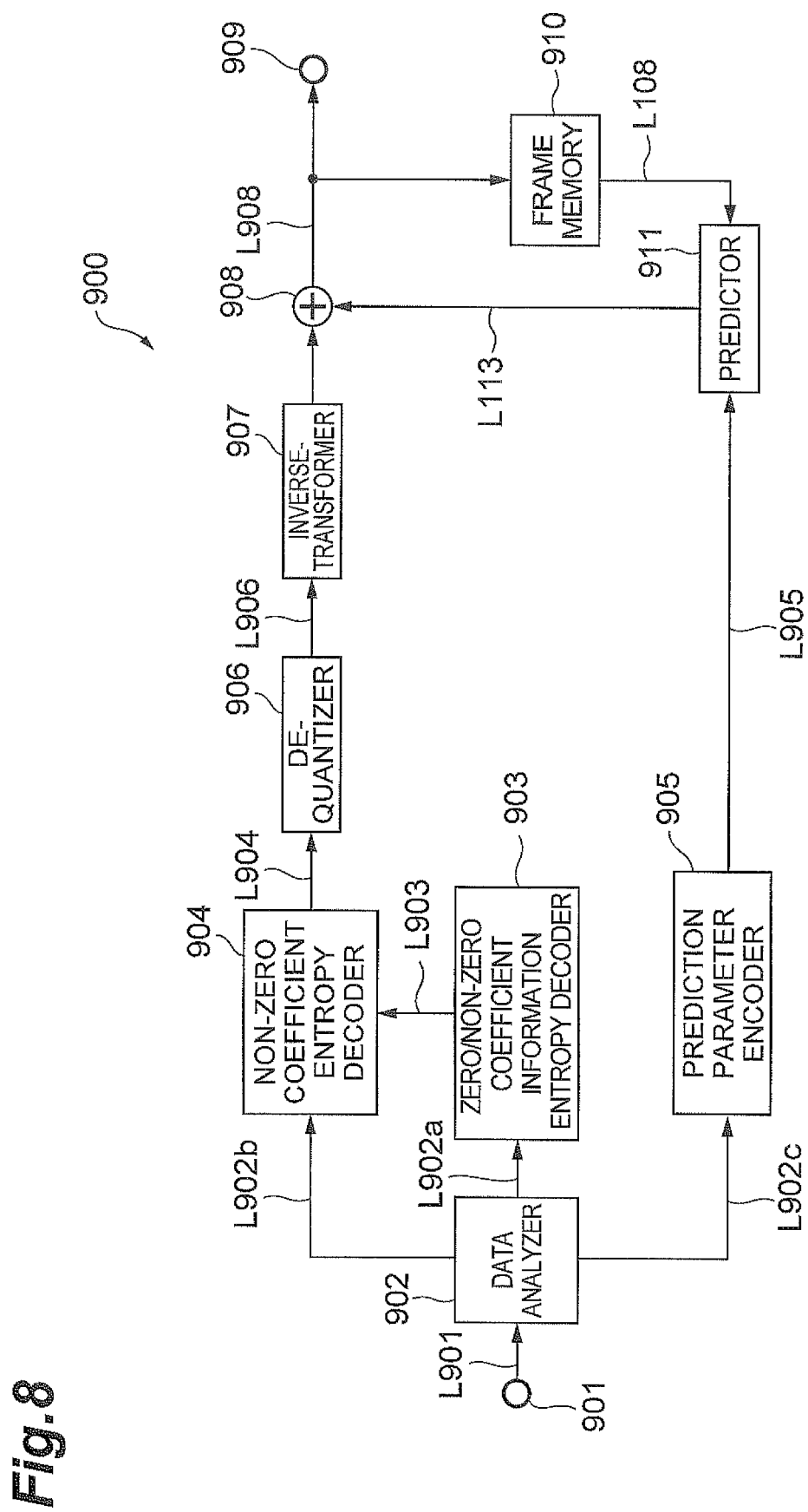
FIG. 8 is a block diagram of an example picture decoding apparatus according to the present embodiments.

FIG. 8 shows a block diagram of an example of an image decoding apparatus 900. The image decoding apparatus 900 may be a computing device or computer, including for example software, hardware, or a combination of hardware and software, as described later, capable of performing the described functionality. The image decoding apparatus 900 may be one or more separate systems or devices included in the image encoding/decoding system, or may be combined with other systems or devices within the image encoding/decoding system. In other examples, fewer or additional blocks may be used to illustrate the functionality of the image decoding device 900. The image decoding apparatus 900, or picture decoding apparatus 900 includes an input terminal 901, a data analyzer 902 (or analysis unit), a zero/non-zero coefficient information entropy decoder 903 (or zero/non-zero coefficient information decoding unit), a non-zero coefficient entropy decoder 904 (or non-zero coefficient decoding unit), a de-quantizer 906 (or de-quantizer unit), an inverse-transformer 907 (or inverse-transform unit), an adder 908 (or picture restoration unit), a frame memory 910, a prediction parameter decoder 905 (or prediction parameter decoder unit), a predictor 911 (or prediction unit), and an output terminal 909.

Operations of the picture decoding apparatus 900 configured above will be described below. When an encoded bit stream is input to the input terminal 901, the data analyzer 902 extracts from the bit stream the encoded data necessary for decoding the target block that is a process target. Then, the data analyzer 902 separates the encoded data of an 8×8 pixel target block serving as the next decoding target (the block size is not limited to 8×8) into encoded data of the residual signal (that is, encoded data obtained by zero-tree encoding the state of the nodes and leaves in the tree structure, and encoded data of the non-zero quantized transform coefficients), and encoded data of the side information necessary for producing the prediction signal. The encoded data obtained by zero-tree encoding the state of the nodes and leaves in the tree structure is output to the zero/non-zero coefficient information entropy decoder 903; the encoded data of the non-zero quantized transform coefficients is output to the non-zero coefficient entropy decoder 904; and the encoded data of the side information necessary for producing the prediction signal is output to the prediction parameter decoder 905.

The zero/non-zero coefficient information entropy decoder 903 entropy-decodes the state of the nodes and leaves in the tree structure of each sub-block (the size of the sub-block is 4×4 pixels here, but not limited to that size) in the target block. Then, the zero/non-zero coefficient information entropy decoder 903 outputs information on the quantized transform coefficients (non-zero quantized transform coefficients) having the state of the decoded leaf of "1", via a line L903 to the non-zero coefficient entropy decoder 904.

The non-zero coefficient entropy decoder 904 entropy-decodes the encoded data of the input non-zero quantized transform coefficients based on the zero/non-zero information of the quantized transform coefficients input via the line L903, and restores the value of the quantized transform coefficients. Decoded values of the restored quantized transform coefficients of each sub-block are output to the de-quantizer 906.

As for decoding of the non-zero quantized transform coefficients, the absolute value and the plus and minus sign of each coefficient are arithmetically decoded in order from the coefficient of the high frequency component to the coefficient of the low frequency component. Specifically, first, based on the absolute value of the previously decoded transform coefficient of the sub-block, the estimated probability to be used for decoding the next transform coefficient is selected. Next, the bin is binary arithmetic decoded using the selected estimated probability, until a correspondence to any non-zero quantized transform coefficient is found in the bin strings in the Unary binarization shown in FIG. 3. Then, according to FIG. 3, the absolute value of the non-zero quantized transform coefficient is decided. Subsequently, the plus and minus sign of the coefficient is also arithmetic decoded using the estimated probability of the plus and minus sign that the plus is "0" and the minus is "1". The decoding process of the non-zero quantized transform coefficient and the estimated probability selection process at the time of decoding the non-zero quantized transform coefficient in the non-zero coefficient entropy decoder 904, are already described with reference to FIG. 5, FIG. 15 and FIG. 16, and detailed description is omitted here.

The de-quantizer 906 de-quantizes the decoded value of the quantized transform coefficients of each sub-block and the transform coefficients of each sub-block is restored. The inverse-transformer 907 inverse-transforms the transform coefficients of each block to produce a reproduction residual signal.

On the other hand, the prediction parameter decoder 905 restores the encoded data of the side information necessary for producing the prediction signal and subsequently, the predictor 911 produces the prediction signal of the target block.

The adder 908 adds the reproduction residual signal of each sub-block to the prediction signal of the target block to restore the reproduction signal of the target block. The restored reproduction signal is output to the frame memory 910 and stored as the reference picture to be used for the prediction process.

Picture Decoding Method

By using FIG. 9, an example process relating to the picture decoding method performed by the picture decoding apparatus 900 will be described below. The diagram illustrates a decoding process for one block. The target block here is an 8×8 pixel block.

First, in the picture decoding apparatus 900, when compressed data is input (S901), the data analyzer 902 extracts the encoded data of the target block (S902). That is, with respect to each sub-block (4×4 pixels) of the target block, the encoded data of the state of the nodes and leaves in the tree structure, the encoded data of the non-zero quantized transform coefficients (coefficients corresponding to the leaves having the state of 1 in the tree structure), and the encoded data of the side information necessary for producing the prediction signal, are extracted. Then, the encoded data of the state of the nodes and leaves in the tree structure is output to the zero/non-zero coefficient information entropy decoder 903, and the encoded data of the non-zero quantized transform coefficients is output to the non-zero coefficient entropy decoder 904, as well as, the encoded data of the side information is output to the prediction parameter decoder 905.

The prediction parameter decoder 905 decodes the encoded data of the side information and the predictor 911 produces the prediction signal of the target block, based on the side information decoded by the prediction parameter decoder 905 (S903).

Subsequently, the zero/non-zero coefficient information entropy decoder 903 decodes the encoded data of the state of the nodes and leaves in the tree structure of each sub-block (4×4 pixels), to restore the state of the nodes and leaves in the tree structure (S904).

The non-zero coefficient entropy decoder 904 restores, based on the decoded state of the nodes and leaves in the tree structure of each sub-block, the value of the quantized transform coefficients having the state of the leaves representing "1" (non-zero quantized transform coefficients) (S905). The decoding of the non-zero quantized transform coefficients will be described below.

In addition, the de-quantizer 906 de-quantizes the quantized transform coefficients of each sub-block, while the inverse-transformer 907 inverse-transforms the de-quantized quantized transform coefficients to thereby restore the residual signal (S906).

Finally, the adder 908 adds the prediction signal to the restored residual signal to restore the reproduction signal of the target block. The restored reproduction signal is temporarily stored in the frame memory 910 (S907).

Figure 9:
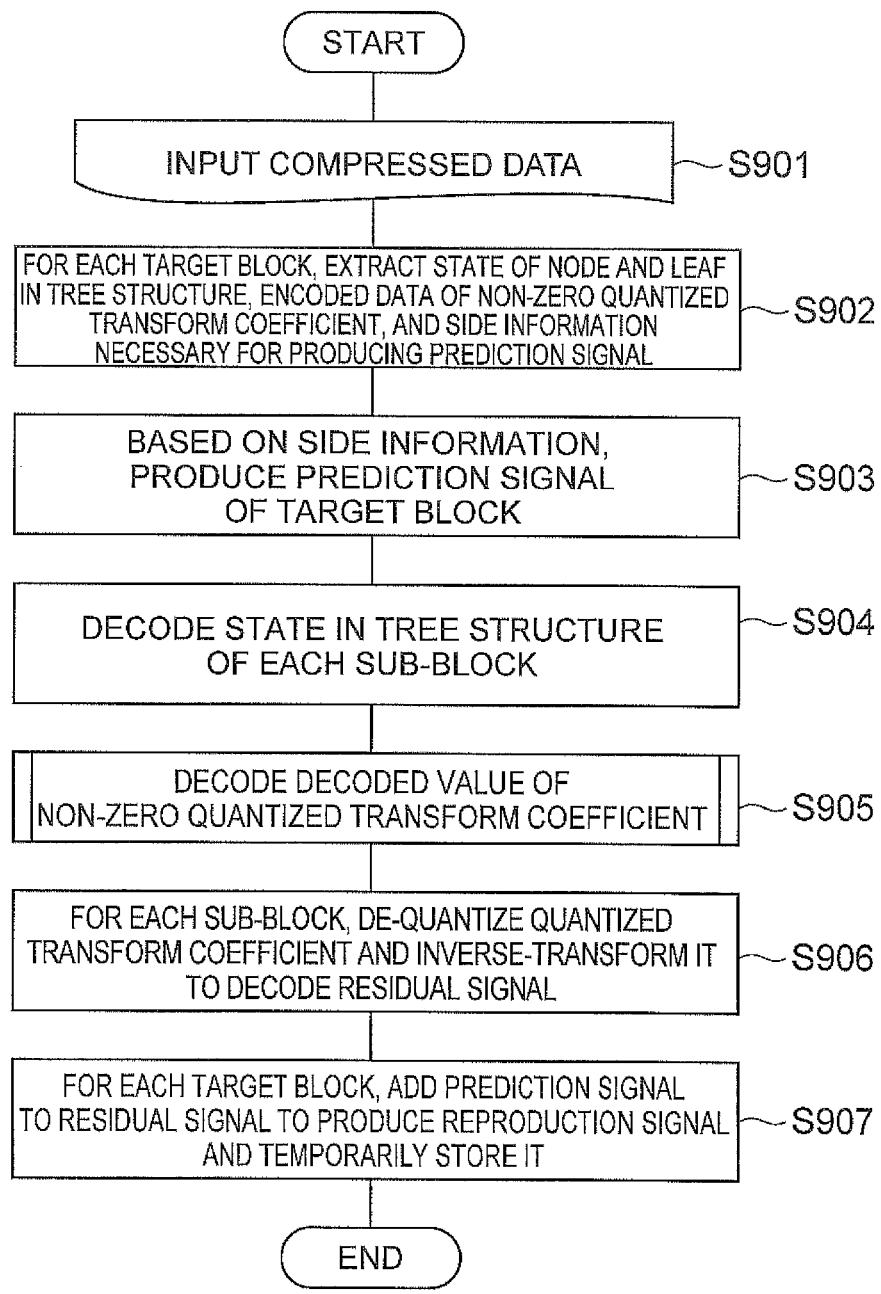
FIG. 9 is a flowchart illustrating an example picture decoding method according to the present embodiments.
Figure 10:
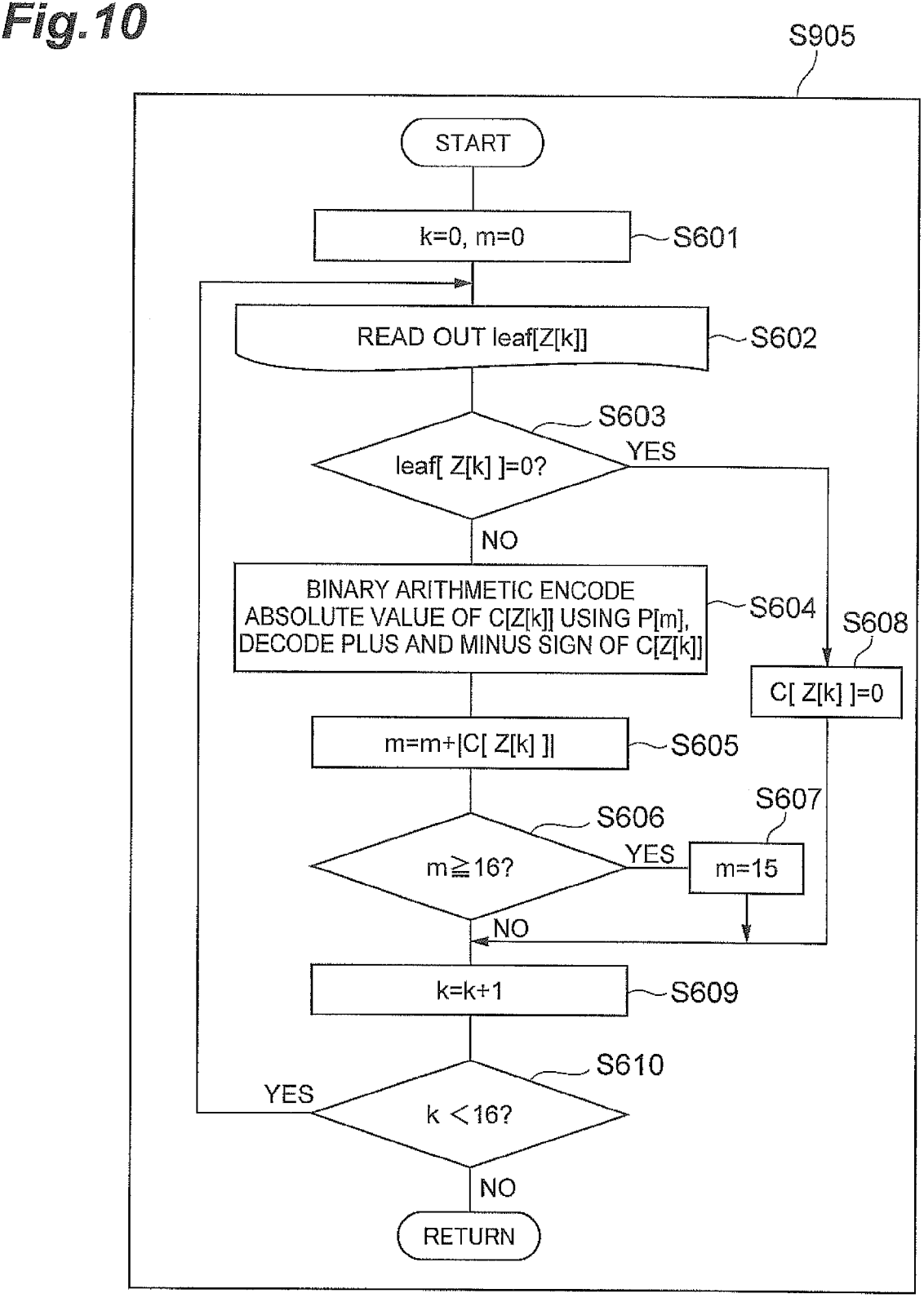
FIG. 10 is a flowchart illustrating example decoding procedures of the non-zero quantized transform coefficient according to the present embodiments.

FIG. 10 shows an example non-zero coefficient decoding process (process at step S905 in FIG. 9) of the quantized transform coefficients for one 4×4 pixel sub-block, which is performed by the non-zero coefficient entropy decoder 904. $Z[k]$ in a flowchart of FIG. 10 represents a transformed index $Z[k]$ obtained by transforming the index k of each coefficient of the quantized transform coefficients in sub-block 301 in FIG. 5 through the inverse zigzag scan into the sequence of coefficients 302. A correspondence between the index k before the transformation and the index $Z[k]$ after the transformation is shown in the table 303 of FIG. 5.

First, the non-zero coefficient entropy decoder 904 initializes k representing a decoding order of the quantized transform coefficients of the sub-block and m representing the index of the estimated probability, to "0" (S601).

Next, the non-zero coefficient entropy decoder 904 reads the value of the leaf$[Z[k]]$ in the structure corresponding to the quantized transform coefficient $C[Z[k]]$ shown in FIG. 5 (S602) and decodes, if the value is "0", $C[Z[k]]$ at S608, while, if not "0", it proceeds to S604 (S603).

At S604, the non-zero coefficient entropy decoder 904 binary arithmetic decodes the absolute value of $C[Z[k]]$ using $P[m]$, and subsequently decodes the binary value of the plus and minus sign of $C[Z[k]]$. The binary arithmetic decoding is already described in FIG. 5, and a detailed description is omitted here.

Then, the non-zero coefficient entropy decoder 904 adds the absolute value of $C[Z[k]]$ to m to update the value of m at S605, and examines whether the value of m is 16 or more at S606. When the value of m is "16" or more, the value of m is set to 15 at S607, and when the value of m is less than "15", "1" is added to the value of k at S609, to decode the next quantized transform coefficient.

Subsequently, until the value of k becomes "16" and the decoding of every quantized transform coefficient of the sub-block is finished, the processes from S602 to S609 are repeated (S610).

It should be noted that at step S605, the absolute value of $C[Z[k]]$ is added to m to update the value of m, but "1", instead of the absolute value of $C[Z[k]]$, may be added.

Modifications

In the above description, encoding and decoding of the non-zero quantized transform coefficients is performed in the order of the inverse zigzag scan proceeding from the high frequency component to the low frequency component, but the order is not limited thereto. For example, for the coefficients of the block 301, the order of a raster scan (the order of $C[0], C[1], C[2]$ ... in the block 301), the order of a zigzag scan (the order of $C[0], C[1], C[4], C[8]$ ... in the block 301, the inverse of the sequence of coefficients 302), or the order of an inverse-raster scan may be applied.

In the above description, the probability model prepared is a single type (configured by $P[0]$ to $P[15]$). In other examples, the probability model may be prepared individually, according to the prediction method, the block size, and the like. In addition, it is unnecessary that the number of pieces of the estimated probability included in the probability model is the same as the number of the transform coefficients in the block. As long as the same probability model is provided at the encoding side and the decoding side, the image encoding/decoding system can be executed with any number of pieces of the estimated probability.

Furthermore, in the above description, when the number of the selected estimated probability becomes larger than the prepared estimated probability, the estimated probability in the lowest occurrence frequency of "0" is selected, but any estimated probability may be predetermined in advance or the estimated probability may be prepared separately.

In the above description, the quantized transform coefficients in the Unary binarization are transformed into a binary code, but other binarization may be used. For example, Truncated Unary binarization where a level of the value is limited; Concatenated unary binarization where the level of the value is classified into two stages; and a fixed length binarization or the like, may be applied to the image encoding/decoding system.

In the above description, arithmetic encoding is used, but the various length encoding may be applied to the image encoding/decoding system. In that case, for example, based on the quantity of and the absolute value of the already encoded/decoded quantized transform coefficients of the block, among a plurality of predetermined various length code tables, a code table to be used for encoding/decoding the next quantized transform coefficient is used.

In the above description, the state of the zero/non-zero coefficients of the quantized transform coefficients in the block are encoded by zero-tree encoding, but is not limited to that method. For example, a method for encoding the quantity of, and a location of, the non-zero coefficients in the block, or zero-run encoding for encoding the number of consecutive zeros in the block, may be used.

Picture Encoding Program, Picture Decoding Program

The image encoding/decoding system may include a picture encoding program for making a computer function as the picture encoding apparatus. Alternatively, the picture encoding method according to the present embodiment may be stored as a computer executable program in a recording medium and/or a computer readable medium. In addition, the image encoding/decoding system may include a picture decoding program for making the computer function as the picture decoding apparatus. Alternatively, the picture decoding method according to the present embodiment may be stored as a computer executable program in the recording medium and/or a computer readable medium.

The picture encoding program and the picture decoding program are stored, for example, in the recording medium and provided. Examples of the recording medium include a recording medium such as a flexible disk, a CD-ROM, and a DVD; a tangible recording medium such as a ROM; and a tangible memory, such as a non-transient memory, such as semiconductor memory and the like.

Figure 13:
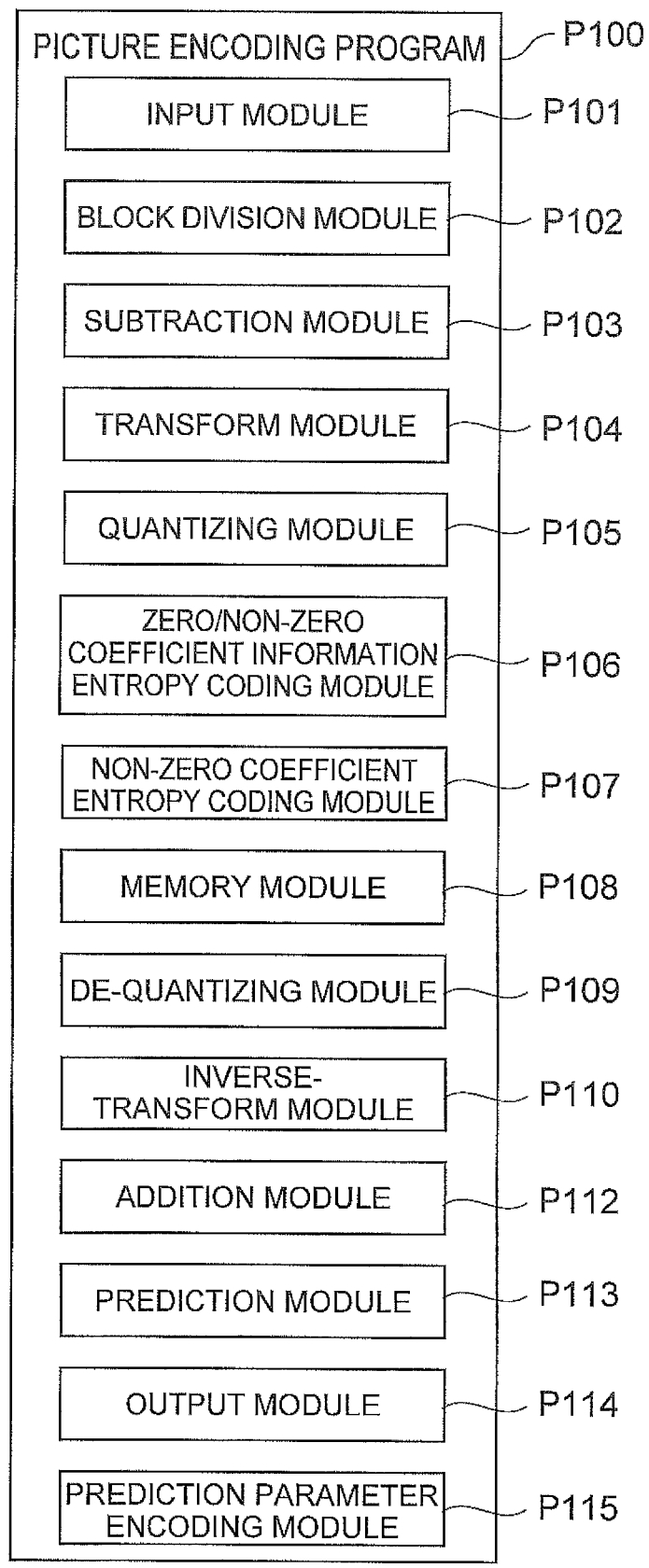
FIG. 13 is a block diagram showing an example of a module configuration of a picture encoding program.

FIG. 13 shows an example of modules of the picture encoding program for making the computer function as the picture encoding apparatus. As shown in FIG. 13, a picture encoding program P100 includes an input module P101, a block division module P102, a subtraction module P103, a transform module P104, a quantizing module P105, a zero/non-zero coefficient information entropy coding module P106, a non-zero coefficient entropy coding module P107, a memory module P108, a de-quantizing module P109, an inverse-transform module P110, an addition module P112, a prediction module P113, an output module P114, and a prediction parameter encoding module P115.

The function to be implemented by executing each module described above, is the similar as the function of the picture encoding apparatus 100 in FIG. 1 mentioned above. That is, in an aspect of the function, the input module P101 in FIG. 11 may generally correspond to the input terminal 101 in FIG. 1, so does the block division module P102 to the block divider 102, the subtraction module P103 to the subtracter 103, the transform module P104 to the transformer 104, the quantizing module P105 to the quantizer 105, the zero/non-zero coefficient information entropy coding module P106 to the zero/non-zero coefficient information entropy encoder 106, the non-zero coefficient entropy coding module P107 to the non-zero coefficient entropy encoder 107, the memory module P108 to the frame memory 108, the de-quantizing module P109 to the de-quantizer 109, the inverse-transform module P110 to the inverse-transformer 110, the addition module P112 to the adder 112, the prediction module P113 to the predictor 113, the output module P114 to the output terminal 114, and the prediction parameter encoding module P115 to the prediction parameter encoder 115, respectively.

Figure 14:
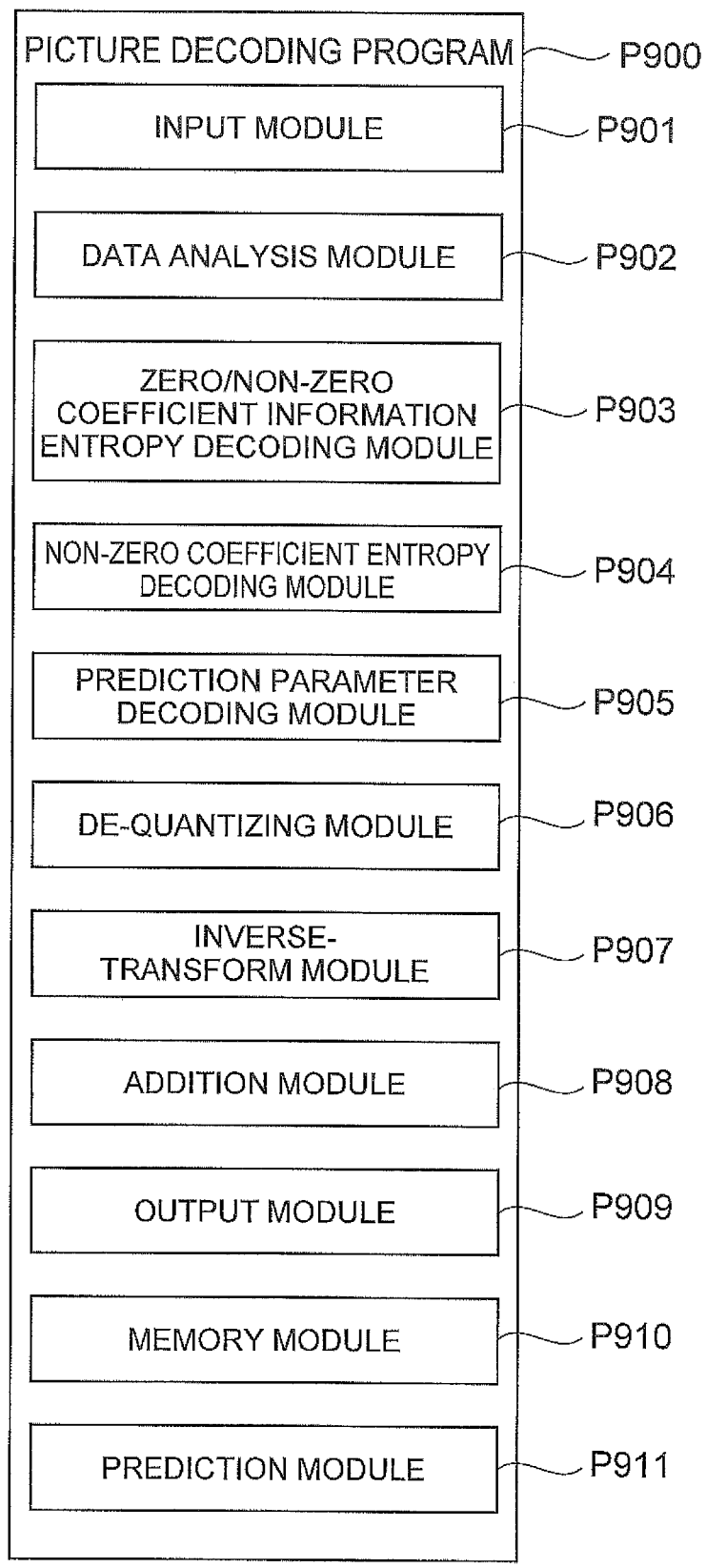
FIG. 14 is a block diagram showing an example of a module configuration of a picture decoding program.

FIG. 14 shows the example modules of the picture decoding program for making the computer function as the picture decoding apparatus. As shown in FIG. 14, a picture decoding program P900 includes, an input module P901, a data analysis module P902, a zero/non-zero coefficient information entropy decoding module P903, a non-zero coefficient entropy decoding module P904, a prediction parameter decoding module P905, a de-quantizing module P906, an inverse-transform module P907, an addition module P908, an output module P909, a memory module P910, and a prediction module P911.

The function to be implemented by executing each module above is similar to the function of the picture decoding apparatus 900 in FIG. 9 mentioned above. That is, in the aspect of the function, the input module P901 in FIG. 14 may generally correspond to the input terminal 901 in FIG. 8, so does the data analysis module P902 to the data analyzer 902, the zero/non-zero coefficient information entropy decoding module P903 to the zero/non-zero coefficient information entropy decoder 903, the non-zero coefficient entropy decoding module P904 to the non-zero coefficient entropy decoder 904, the prediction parameter decoding module P905 to the prediction parameter decoder 905, the de-quantizing module P906 to the de-quantizer 906, the inverse-transform module P907 to the inverse-transformer 907, the addition module P908 to the adder 908, the output module P909 to the output terminal 909, the memory module P910 to the frame memory 910, and the prediction module P911 to the predictor 911, respectively.

In an example embodiment, at least a portion of the previously described picture encoding program P100 and the picture decoding program P900 may be stored in a non-transitory computer readable recording medium 10 shown in FIG. 11, and executed by a computer 30 described below. Alternatively or in addition, at least a portion of the previously described picture encoding program P100 and the picture decoding program P900 may be stored in the working memory 14, and/or the memory 16, which are also non-transitory computer readable mediums.

Figure 11:
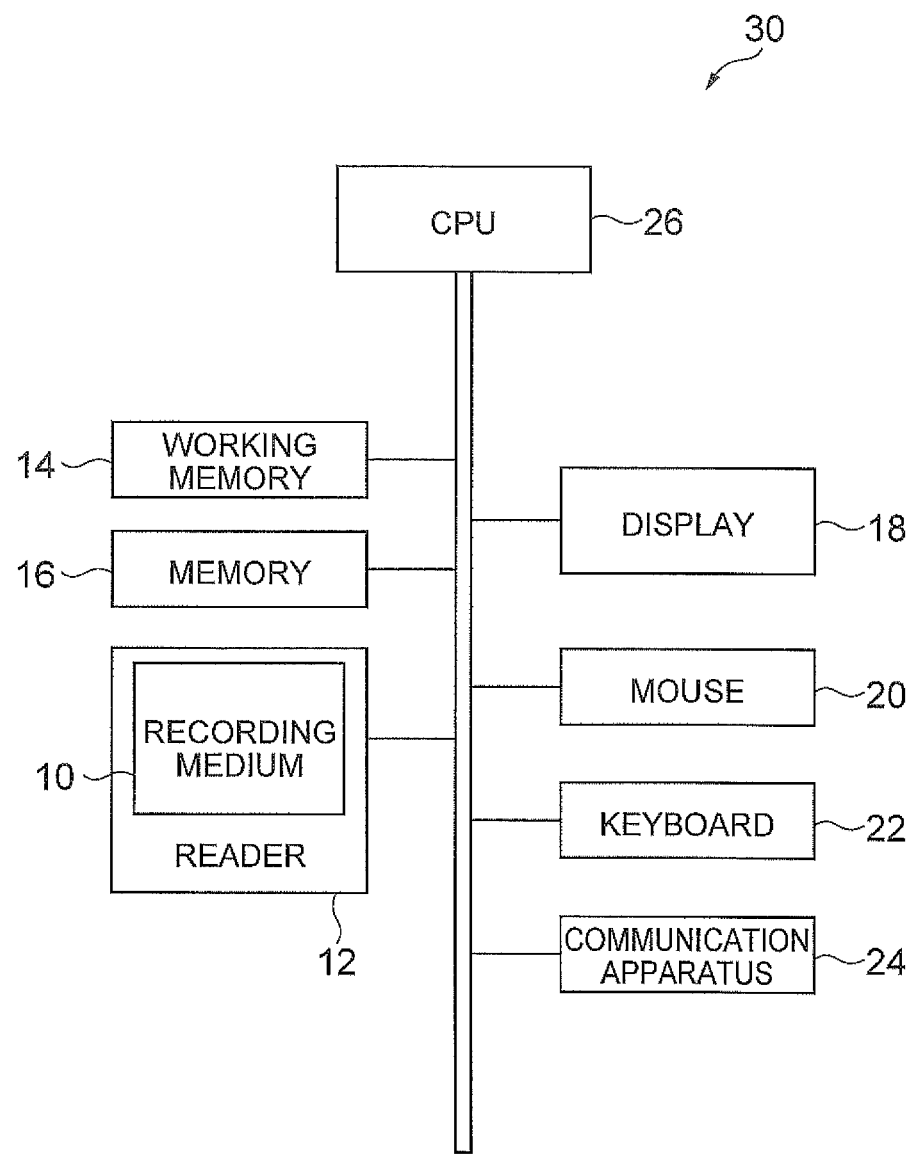
FIG. 11 is a view of an example hardware configuration of a computer for executing a program recorded in a recording medium.
Figure 12:
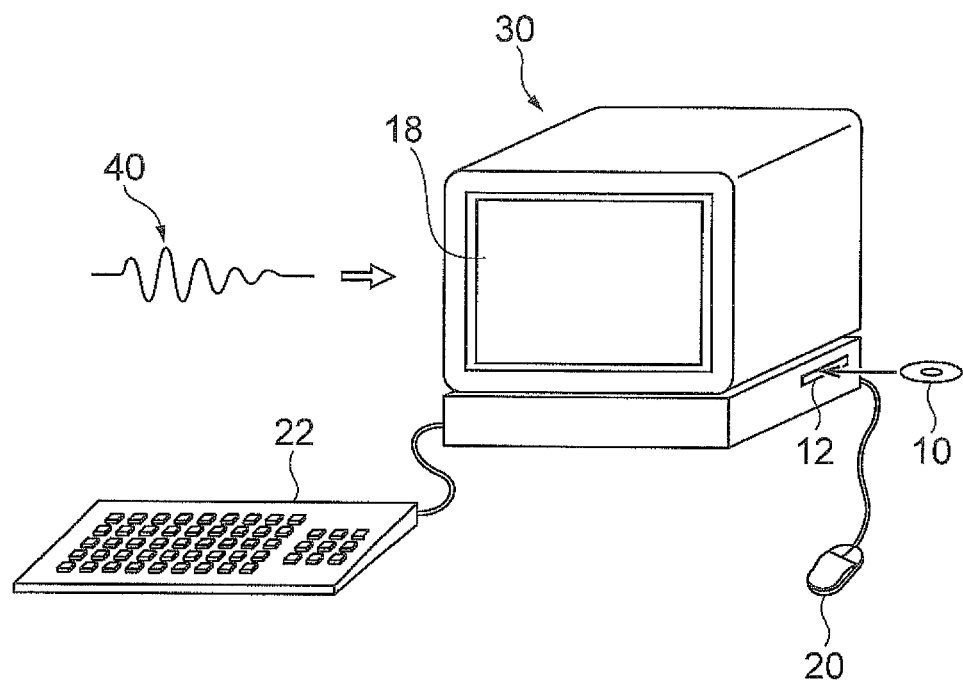
FIG. 12 is a perspective view of the computer of FIG. 11.

FIG. 11 is a view showing an example hardware configuration of a computer for executing a program, such as a program recorded in the recording medium and/or a computer readable medium, while FIG. 12 is a perspective view of the computer for executing the program stored in the recording medium and/or the computer readable medium. Although illustrated in FIG. 12 in the form of a personal computer, the computer may be configured as any device, or combination of devices, such as a DVD player, a set top box, a cell-phone and the like, which are provided with a CPU and software for executing a process and control.

In the example configuration of FIG. 11, the computer 30 may include a reader 12 such as a flexible disk drive apparatus, a CD-ROM drive apparatus, and a DVD drive apparatus, a communication port such as a universal serial bus port (USB), bluetooth port, an infrared communication port, or any other type of communication port that allows communication with an external device, such as another computer or memory device. The computer 30 may also include a working memory 14 that may include a resident operating system, and a memory 16 for storing data, such as at least a part of the program stored in a recording medium 10. The working memory 14 and memory 16 may be one or more computer readable medium, and can include a solid-state memory such as a memory card or other package that houses one or more non-volatile read-only memories. Further, the computer readable medium can be a random access memory or other volatile re-writable memory. Additionally or alternatively, the computer-readable medium can include a magneto-optical or optical medium, such as a disk or tapes or any other storage device to capture carrier wave signals such as a signal communicated over a transmission medium. A digital file attachment to an e-mail, stored in a storage device, or other self-contained information archive or set of archives may be considered a distribution medium that is a tangible storage medium. Accordingly, the embodiments are considered to include any one or more of a computer-readable medium or a distribution medium and other equivalents and successor media, in which data or instructions may be stored. In addition, the computer 30 may have a user interface that includes a display apparatus 18 such as a display, input apparatuses such as a mouse 20 and a keyboard 22, a touch screen display, a microphone for receipt of voice commands, a sensor, or any other mechanism or device that allows a user to interface with the computer 30. In addition, the computer 30 may include a communication apparatus 24 for transmitting and receiving data and the like; and a central processor unit (CPU) or processor 26 for controlling execution of the program. The processor 26 may be one or more one or more general processors, digital signal processors, application specific integrated circuits, field programmable gate arrays, digital circuits, analog circuits, combinations thereof, and/or other now known or later developed devices for analyzing and processing data. In one example, upon insertion of the recording medium 10 into the reader 12, at least a portion of the picture encoding program P100 stored in the recording medium 10 becomes accessible from the reader 12 and the picture encoding program P100 enables the computer 30 to operate as the picture encoding apparatus. In addition, upon insertion of the recording medium 10 into the reader 12, at least a portion of the picture decoding program P900 stored in the recording medium 10 becomes accessible from the reader 12, and the picture decoding program P900 enables the computer 30 to operate as the picture decoding apparatus. In other examples, the recording medium 10 provides enablement or initialization of the picture encoding program P100 and/or picture decoding program P900 stored in at least one of the working memory 14 and the memory 16.

As shown in FIG. 12, the picture encoding program or the picture decoding program may be provided as a computer data signal 40 superimposed on a carrier wave through a network. In that case, the computer 30 is capable of storing the picture encoding program or the picture decoding program that is received by the communication apparatus 24, in at least the memory 16 and of executing the picture encoding program or the picture decoding program following storage in the non-transitory computer readable medium.

According to the embodiments described above, since the estimated probability to be used for encoding/decoding the absolute value of the next non-zero quantized transform coefficient, is selected, based on the quantity of the already encoded/decoded quantized transform coefficients in the block or the absolute value of the quantized transform coefficient, it is possible to encode a prediction error signal efficiently in accordance with features of the block or the state of the previously encoded quantized transform coefficient in the block.

REFERENCE SIGNS LIST

100: picture encoding apparatus; 101, 901: input terminal; 102: block divider; 103: subtracter; 104: transformer; 105: quantizer; 106: zero/non-zero coefficient information entropy encoder; 107: non-zero coefficient entropy encoder; 108, 910: frame memory; 109, 906: de-quantizer; 110, 907: inverse-transformer; 112, 908: adder; 113, 911: predictor; 114, 909: output terminal; 115: prediction parameter encoder; 900: picture decoding apparatus; 902: data analyzer; 903: zero/non-zero coefficient information entropy decoder; 904: non-zero coefficient entropy decoder; and 905: prediction parameter decoder.

The invention claimed is:

1. A picture decoding apparatus comprising:
a processor;
a data analysis unit executable by the processor to extract, from compressed data, encoded data of a residual signal of a region serving as a process target;
a zero/non-zero coefficient information decoding unit executable by the processor to decode the encoded data of the residual signal of the region to restore information representing each quantized transform coefficient of the region as either a zero coefficient or a non-zero coefficient;
a non-zero coefficient decoding unit executable by the processor to decode the encoded data of the residual signal of the region to restore a non-zero quantized transform coefficient;
a de-quantizing unit executable by the processor to de-quantize the decoded quantized transform coefficient of the region to produce a reproduction frequency transform coefficient;
an inverse-transform unit executable by the processor to inverse-transform the reproduction frequency transform coefficient of the region to produce a reproduction residual signal;
a prediction unit executable by the processor to produce a prediction signal for a pixel signal included in the region; and
a picture restoration unit executable by the processor to add the prediction signal of the region and the reproduction residual signal to restore the pixel signal of the region; wherein
the non-zero coefficient decoding unit is further executable by the processor to select, from a probability model composed of a plurality of estimated probabilities, an N-th estimated probability used by the processor to decode an absolute value of a next non-zero quantized transform coefficient of the region, the estimated probability selected from the probability model based on a quantity of already decoded non-zero quantized transform coefficients of the region being N.

2. A picture decoding apparatus comprising:
a processor;
a data analysis unit executable by the processor to extract, from compressed data, encoded data of a residual signal of a region serving as a process target;
a zero/non-zero coefficient information decoding unit executable by the processor to decode the encoded data of the residual signal of the region to restore information representing each quantized transform coefficient of the region as either a zero coefficient or a non-zero coefficient;
a non-zero coefficient decoding unit executable by the processor to decode the encoded data of the residual signal of the region to restore a non-zero quantized transform coefficient of the region;
a de-quantizing unit executable by the processor to de-quantize the decoded quantized transform coefficient of the region to produce a reproduction frequency transform coefficient;
an inverse-transform unit executable by the processor to inverse-transform the reproduction frequency transform coefficient of the region to produce a reproduction residual signal;
a prediction unit executable by the processor to produce a prediction signal for a pixel signal included in the region; and
a picture restoration unit executable by the processor to add the prediction signal of the region and the reproduction residual signal to restore the pixel signal of the region; wherein
the non-zero coefficient decoding unit is further executable by the processor to select, from a probability model composed of a plurality of estimated probabilities arranged in an order to indicate a probability of occurrence of a zero in a decoded non-zero Quantized transform coefficient, an estimated probability used by the processor to decode an absolute value of a next non-zero quantized transform coefficient of the region, the estimated probability selected from among the plurality of estimated probabilities in the estimated probability model based on an absolute value of an already decoded non-zero quantized transform coefficient of the region.

3. The picture decoding apparatus according to claim 2, wherein a sum of the absolute value of the already decoded non-zero quantized transform coefficient is N, and the non-zero coefficient decoding unit is further executable by the processor to decode the absolute value of the next non-zero quantized transform coefficient, using an N-th estimated probability in the probability model composed of the plurality of estimated probabilities.

4. The picture decoding apparatus according to claim 1, wherein a quantity of the estimated probabilities in the probability model is M, and in response to N exceeding M, the non-zero coefficient decoding unit is further executable by the processor to decode the absolute value of the next non-zero quantized transform coefficient, using an M-th estimated probability included in the probability model.

5. The picture decoding apparatus according to claim 1, wherein the non-zero coefficient decoding unit is further executable by the processor to decode the non-zero quantized transform coefficients in an order proceeding from a coefficient of a high frequency component to a coefficient of a low frequency component.

6. A picture decoding method that is performed by a picture decoding apparatus, the picture decoding method comprising:
   extracting, from compressed data, encoded data of a residual signal of a region serving as a process target, the encoded data extracted with a processor included in the picture decoding apparatus;
   decoding the encoded data of the residual signal of the region with the processor to restore information representing each quantized transform coefficient of the region as either a zero coefficient or a non-zero coefficient;
   decoding the encoded data of the residual signal of the region with the processor to restore a non-zero quantized transform coefficient;
   de-quantizing the decoded quantized transform coefficient of the region with the processor to produce a reproduction frequency transform coefficient;
   inverse-transforming the reproduction frequency transform coefficient of the region with the processor to produce a reproduction residual signal;
   producing a prediction signal for a pixel signal included in the region with the processor;
   adding the prediction signal of the region and the reproduction residual signal with the processor to restore the pixel signal of the region;
   selecting with the processor from a probability model composed of a plurality of estimated probabilities, an N-th estimated probability selected from the probability model based on a quantity of already decoded non-zero quantized transform coefficients of the region being N; and
   decoding an absolute value of a next non-zero quantized transform coefficient of the region with the processor using the selected estimated probability.

7. A picture decoding method that is performed by a picture decoding apparatus, the picture decoding method comprising:
   extracting, from compressed data, encoded data of a residual signal of a region serving as a process target, the encoded data extracted with a processor included in the picture decoding apparatus;
   decoding the encoded data of the residual signal of the region with the processor to restore information representing each quantized transform coefficient of the region as either a zero coefficient or a non-zero coefficient;
   decoding the encoded data of the residual signal of the region with the processor to restore a non-zero quantized transform coefficient;
   de-quantizing the decoded quantized transform coefficient of the region with the processor to produce a reproduction frequency transform coefficient;
   inverse-transforming the reproduction frequency transform coefficient of the region with the processor to produce a reproduction residual signal;
   producing a prediction signal for a pixel signal included in the region with the processor;
   adding the prediction signal of the region and the reproduction residual signal with the processor to restore the pixel signal of the region;
   selecting with the processor from a probability model composed of a plurality of estimated probabilities, an N-th estimated probability selected from the probability model based on an absolute value of an already decoded non-zero quantized transform coefficient of the region being N; and
   decoding an absolute value of a next non-zero quantized transform coefficient of the region with the processor using the selected estimated probability.

8. A non-transitory computer readable storage medium for an image encoding/decoding system, the computer readable storage medium comprising instructions executed by a computer for image decoding, the instructions comprising:
   a data analysis module executable to extract, from compressed data, encoded data of a residual signal of a region serving as a process target;
   a zero/non-zero coefficient information decoding module executable to decode the encoded data of the residual signal of the region to restore information representing each quantized transform coefficient of the region as either a zero coefficient or a non-zero coefficient;
   a non-zero coefficient decoding module executable to decode the encoded data of the residual signal of the region to restore a non-zero quantized transform coefficient;
   a de-quantizing module executable to de-quantize the decoded quantized transform coefficient of the region to produce a reproduction frequency transform coefficient;
   an inverse-transform module executable to inverse-transform the reproduction frequency transform coefficient of the region to produce a reproduction residual signal;
   a prediction module executable to produce a prediction signal for a pixel signal included in the region; and
   a picture restoration module executable to add the prediction signal of the region and the reproduction residual signal to restore the pixel signal of the region; wherein
   the non-zero coefficient decoding module is further executable to select, from a probability model composed of a plurality of estimated probabilities, an N-th estimated probability used to decode an absolute value of a next non-zero quantized transform coefficient of the region, the estimated probability selected from the probability model based on a quantity of already decoded non-zero quantized transform coefficients of the region being N.

9. A non-transitory computer readable storage medium for an image encoding/decoding system, the computer readable storage medium comprising instructions executed by a computer for image decoding, the instructions comprising:
   a data analysis module executable to extract, from compressed data, encoded data of a residual signal of a region serving as a process target;
   a zero/non-zero coefficient information decoding module executable to decode the encoded data of the residual signal of the region to restore information representing each quantized transform coefficient of the region as either a zero coefficient or a non-zero coefficient;

a non-zero coefficient decoding module executable to decode the encoded data of the residual signal of the region to restore a non-zero quantized transform coefficient;
a de-quantizing module executable to de-quantize the decoded quantized transform coefficient of the region to produce a reproduction frequency transform coefficient;
an inverse-transform module executable to inverse-transform the reproduction frequency transform coefficient of the region to produce a reproduction residual signal;
a prediction module executable to produce a prediction signal for a pixel signal included in the region; and
a picture restoration module executable to add the prediction signal of the region and the reproduction residual signal to restore the pixel signal of the region; wherein
the non-zero coefficient decoding module is further executable to select, from a probability model composed of a plurality of estimated probabilities, an N-th estimated probability used to decode an absolute value of a next non-zero quantized transform coefficient of the region, the estimated probability selected from the probability model based on an absolute value of an already decoded non-zero quantized transform coefficient of the region being N.

* * * * *